United States Patent
Wang et al.

(10) Patent No.: US 7,839,923 B2
(45) Date of Patent: Nov. 23, 2010

(54) METHOD AND SYSTEM FOR EQUALIZING RECEIVED SIGNALS IN COMMUNICATIONS SYSTEMS

(75) Inventors: Cindy Chun Wang, Newark, CA (US); Guogang Li, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 1081 days.

(21) Appl. No.: 11/442,838

(22) Filed: May 30, 2006

(65) Prior Publication Data
US 2006/0291550 A1   Dec. 28, 2006

Related U.S. Application Data

(60) Provisional application No. 60/693,457, filed on Jun. 22, 2005.

(51) Int. Cl.
H03H 7/30    (2006.01)
(52) U.S. Cl. ...................................... 375/233
(58) Field of Classification Search ................. 341/118, 341/144; 375/231, 233, 260, 296, 350; 708/323
See application file for complete search history.

(56) References Cited

U.S. PATENT DOCUMENTS

| | | | | |
|---|---|---|---|---|
| 3,978,407 | A * | 8/1976 | Forney et al. | 375/231 |
| 5,134,578 | A | 7/1992 | Garverick et al. | |
| 5,283,811 | A * | 2/1994 | Chennakeshu et al. | 375/233 |
| 5,367,540 | A * | 11/1994 | Kakuishi et al. | 375/350 |
| 5,610,950 | A | 3/1997 | Duch | |
| 6,489,909 | B2 * | 12/2002 | Nakao et al. | 341/144 |
| 6,603,825 | B1 | 8/2003 | Pecen | |
| 6,640,093 | B1 | 10/2003 | Wildhagen | |
| 6,891,908 | B2 | 5/2005 | Matsu Moto et al. | |
| 7,020,190 | B2 | 3/2006 | Sullivan | |
| 7,039,130 | B2 * | 5/2006 | Hurley | 375/326 |
| 7,173,982 | B1 | 2/2007 | Yang et al. | |
| 7,184,729 | B2 | 2/2007 | Kluge et al. | |

(Continued)

OTHER PUBLICATIONS

Wolfgang et al ("80-Mb/s QPSK and 72-Mb/s 64-QAM Flexible and Scalable Digital OFDM Transceiver ASICs for Wireless Local Area Networks in the 5-GHz Band" IEEE Journal of Solid-State Circuits, IEEE Service Center, Piscataway, N J, US, vol. 36, No. 11 Nov. 2002, pp. 1831-1834, XP011061618, ISSN: 0018-9200).*

(Continued)

*Primary Examiner*—David C Payne
*Assistant Examiner*—Leon-Viet Q Nguyen

(57) ABSTRACT

A communications system includes a carrier recovery module that determines a carrier frequency offset of an input signal. A rotator module rotates the input signal to minimize the carrier frequency offset and generates a compensated signal. A correlator module correlates the compensated signal with a unique word to obtain a timing correction. An equalizer module equalizes the compensated signal based on the timing correction and generates an equalized signal. The carrier recovery module includes a burst detector module that detects a burst in response to a preamble of the input signal and an average detector to set a gain of a programmable gain amplifier (PGA). The average detector is disabled during burst search by the burst detector module and enabled at a beginning of each burst, outputs burst data to a digital signal processor when the average detector is enabled, and does not output the burst data to the digital signal processor when the average detector is disabled.

38 Claims, 11 Drawing Sheets

U.S. PATENT DOCUMENTS

| | | | |
|---|---|---|---|
| 7,245,686 B2 * | 7/2007 | Weiss et al. | 375/372 |
| 7,313,196 B1 * | 12/2007 | Hall et al. | 375/296 |
| 7,352,411 B2 | 4/2008 | Jaffe | |
| 7,457,366 B2 * | 11/2008 | Maltsev et al. | 375/260 |
| 7,474,695 B2 * | 1/2009 | Liu et al. | 375/233 |
| 2004/0161055 A1 | 8/2004 | Sinha | |
| 2005/0176394 A1 | 8/2005 | Inogai | |
| 2005/0216540 A1 | 9/2005 | Wen et al. | |
| 2005/0276354 A1 * | 12/2005 | Su et al. | 375/326 |

OTHER PUBLICATIONS

Lin et al ("On-Line CORDIC Algorithms", IEEE Transactions on Computers, Publication Date: Aug. 1990, vol. 39, Issue: 8 On pp. 1038-1052).*

Nakao et al (US6489909) in view of Lin et al ("On-Line CORDIC Algorithms", IEEE Transactions on Computers, Publication Date: Aug. 1990, vol. 39, Issue: 8 On pp. 1038-1052).*

Wolfgang Eberle et al: "80-Mb/s QPSK and 72-Mb/s 64-QAM Flexible and Scalable Digital OFDM Transceiver ASICs for Wireless Local Area Networks in the 5-GHz Band" IEEE Journal of Solid-State Circuits, IEEE Service Center, Piscataway, NJ, US, vol. 36, No. 11, Nov. 2002, pp. 1831-1834, XP011061618, ISSN: 0018-9200.

Denwei Fu et al: "A Fast Synchronizer for Burst Modems with Simultaneous Symbol Timing and Carrier Phase Estimations" Circuits and Systems, 2000. Proceedings. ISCAS 200 Geneva, The 2000 IEEE International Symposium on May 28-31, 2000, Piscataway, NJ, USA, IEEE, vol. 3, May 28, 2000, pp. 379-382, XP010502547.

Notification of Transmittal of The International Search Report and The Written Opinion of the International Searching Authority, or The Declaration for International Application No. PCT/US2006/022669, dated Nov. 6, 2006, 14 pages.

U.S. Appl. No. 60/693,457, filed Jun. 22, 2005, Wang, Cindy Chun et al.

U.S. Appl. No. 60/766,591, filed Jan. 30, 2006, Zhou, Xuan et al.

H. Dawid and H. Meyr, "CORDIC Algorithms and Architectures," Chapter 24, 1999. http://www.eecs.berkeley.edu/~newton/Classes/EE290sp99/lectures/ee290aSp996_1/cordic_chap24.pdf.

Kota, K.; Cavallaro, J.r., "Numerical Accuracy and Hardware Tradeoffs for CORDIC Arithmetic for Special-Purpose Processors." IEEE Transactions on Computers, vol. 42, No. 7, pp. 769-779, Jul 1993.

Ray Andraka; "A survey of CORDIC algorithms for FPGA based computers"; 1998; 10 pages.

* cited by examiner

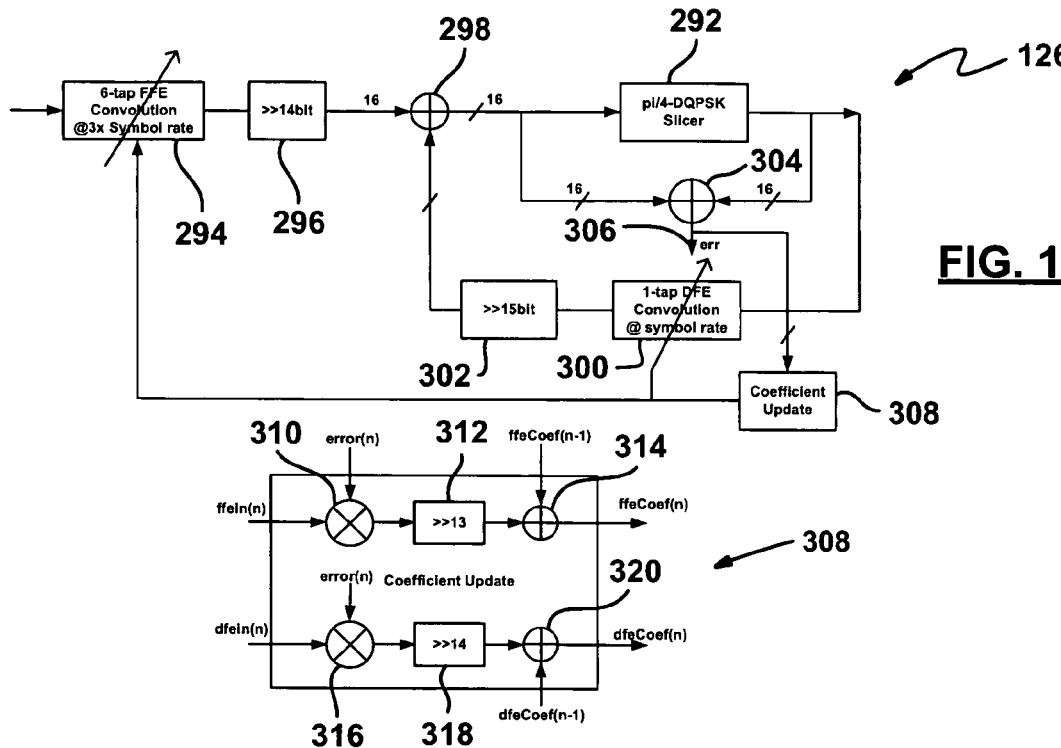
FIG. 14A
FIG. 14B
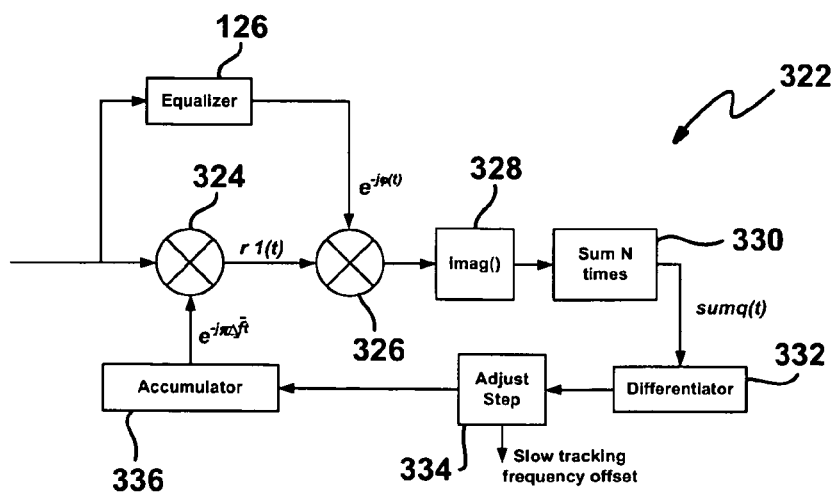
FIG. 15

METHOD AND SYSTEM FOR EQUALIZING RECEIVED SIGNALS IN COMMUNICATIONS SYSTEMS

CROSS-REFERENCE TO RELATED APPLICATIONS

This application claims the benefit of U.S. Provisional Application No. 60/693,457, filed on Jun. 22, 2005. The disclosure of the above application is incorporated herein by reference in its entirety.

FIELD

The present disclosure relates to communications systems, and more particularly to communications systems and methods for enhancing error correction due to frequency offsets.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Communications systems such as cellular systems and wireless systems allow users to transmit and receive data wirelessly between users and/or between users and a cell station. Typically, the cellular and wireless systems must operate at a specific frequency and a below a specific power level. Within those constraints, the cellular and wireless systems attempt to maximize data transfer for individual users while accommodating the demands of all of the other users that share the cellular or wireless system. Therefore, each wireless device must wisely use allocated bandwidth to maximize data transfer. Designers of these systems may also be limited by market demands for low cost devices and ongoing cost of operation.

There are a number of approaches that have been developed to maximize the use of the allocated bandwidth while minimizing interference between cellular and wireless users. For example, one approach involves allocating the available bandwidth using time division multiple access (TDMA). TDMA is a digital signal transmission scheme that allows multiple users to access a single radio-frequency (RF) channel. Interference between channels is avoided by allocating unique time slots to each user within each channel. Other approaches include spread spectrum techniques that involve spreading or splitting transmit signals over multiple different frequencies and recombining the signal at a receiver. Spread spectrum approaches typically tend to be more complex and increase the cost of the wireless device and the overall cost of operation.

Various different types of communications systems employ TDMA. For example, cellular systems often use TDMA. Once cellular system that uses TDMA is a Personal Handy-phone System (PHS), which is a mobile telephone system that operates in the 1.88-1.93 GHz frequency band. PHS has been popular in markets with strong demand for low cost cellular phones and cost of operation. PHS is a cordless telephone system with capability to handover signals from one cell to another. PHS cells are smaller than cells of cellular phone systems that use Global System for Mobile communication (GSM).

Typically, PHS has a transmission power of 500 mW and a range of 10-100 meters. PHS provides service with minimal congestion in areas of heavy call-traffic such as business districts, downtown, etc. This is accomplished by installing cell stations at a radial distance of every 100-200 meters. Thus, PHS is particularly suitable for use in urban areas.

PHS-based phones can be used in homes, offices, and outdoors. PHS offers a cost-effective alternative to conventional phone systems that use ground lines. Additionally, PHS-based phones can interface with conventional phone systems. Thus, where ground lines of conventional phone systems cannot reach a physical location of a subscriber, the subscriber can use PHS to reach the conventional phone system and establish communication with other subscribers served by the conventional phone system.

PHS uses time division multiple access (TDMA) as radio interface and adaptive differential pulse code modulation (ADPCM) as voice coder-decoder (codec). A codec includes an analog-to-digital converter (ADC) and a digital-to-analog converter (DAC) that translate signals between analog and digital formats. TDMA is a digital signal transmission scheme that allows multiple users to access a single radio-frequency (RF) channel. Interference between channels is avoided by allocating unique time slots to each user within each channel. For example, a PHS frame comprises four channels: one control channel and three traffic channels.

Unlike PCM codecs that quantize speech signals directly, ADPCM codecs quantize a difference between a speech signal and a prediction made of the speech signal. If the prediction is accurate, the difference between actual and predicted speech may have a lower variance than variance in actual speech. Additionally, the difference may be accurately quantized with fewer bits than the number of bits that would be needed to quantize the actual speech. While decoding, a quantized difference signal is added to a predicted signal to reconstruct an original speech signal. The performance of the codec is aided by using adaptive prediction and quantization so that a predictor and a difference quantizer adapt to changing characteristics of speech being coded.

Referring now to FIG. 1, a PHS phone system includes a PHS phone 10 with an antenna 12 and a cell station 11 having an antenna 13. An exemplary PHS phone 10 comprises a signal processing module 16 including a transmit module 18 and a receive module 20, memory 22, a power supply 24, and an I/O module 26. The I/O module 26 may comprise various user-interfaces such as a microphone 26-1, a speaker 26-2, a display 26-3, a keypad 26-4, a camera 26-5, etc.

The transmit module 18 converts user input from the microphone 26-1 into PHS-compatible signals. The receive module 20 converts data received from the antenna 12 into a user-recognizable format and outputs the same via speaker 26-2. The signal processing module 16 uses memory 22 to process data transmitted to and received from the antenna 12. The power supply 24 provides power to the phone 10.

Digital data is typically represented by zeros and ones, which are called bits. Data is generally transmitted by modulating amplitude, frequency, or phase of a carrier signal with a base-band information-bearing signal. Quadrature phase shift keying (QPSK) is a form of phase modulation generally used in communication systems. In QPSK, information bits are grouped in pairs called dibits. Thus, QPSK uses four symbols that represent dibit values 00, 01, 10, and 11. QPSK maps the four symbols to four fixed phase angles. For example, symbol 00 may be mapped to $(+3\pi/4)$. On the other hand, $\pi/4$-DQPSK uses differential encoding wherein mapping between symbols and phase angle varies. Additionally, π/4-DQPSK maps each of the four symbols to a real and an imaginary phase angle resulting in an eight-point constellation.

Referring now to FIGS. 2A-2B, the transmit module 18 comprises an ADPCM module 50, a framer module 52, a serial-to-parallel converter module 54, a DQPSK mapper module 56, a square-root raised cosine (SRRC) filter module 58, and an upsample module 60. The receive module 20 comprises a downsample module 70, an automatic gain control (AGC) module 72, a demodulator 75 including a carrier acquisition module 74 and an equalization module 76, a de-mapper and parallel-to-serial converter module 78, a de-framer module 80, and an ADPCM module 82.

When transmitting data from the phone 10 on a channel, the ADPCM module 50 converts audio and/or video signal into bits of digital data. The framer module 52 partitions the digital data into frames. The serial-to-parallel converter module 54 converts the bits in the frames into symbols. The DQPSK mapper module 56, which may utilize a modulation scheme such as π/4-DQPSK modulation, maps four real and four imaginary values of four symbols in each frame to a total of eight phase angles and generates a complex baseband signal.

The SRRC filter module 58, which is essentially a Nyquist pulse-shaping filter, limits the bandwidth of the signal. Additionally, the SRRC filter module 58 removes mixer products from the complex baseband signal. The upsample module 60 comprises a quadrature carrier oscillator that is used to convert the phase-modulated baseband signal into a phase-modulated carrier signal. The upsample module 60 transmits the phase-modulated carrier signal on the channel at a sampling frequency that is greater than twice the Nyquist frequency.

When the phone 10 receives a signal from the antenna 12, the downsample module 70 downsamples the signal using an asynchronous oscillator. The downsample module 70 down-converts the signal from the phase-modulated carrier signal to the phase modulated baseband signal. The AGC module 72 maintains the gain of the signal relatively constant despite variation in input signal strength due to transmission losses, noise, interference, etc.

The carrier acquisition module 74 demodulates the signal, retrieves carrier phase information, and decodes symbol values from the signal. The equalization module 76 corrects any distortion present in the signal. The de-mapper and parallel-to-serial converter module 78 de-maps and converts the demodulated signal into a serial bit-stream. The de-framer module 80 de-partitions the frames into digital data bits. The ADPCM module 82 converts the digital data bits into audio and/or video data and outputs the data to the speaker 26-2 and/or the display 26-3 of the phone 10.

Legacy communications systems such as the Personal Handy-phone System (PHS) are configured to be simple and low cost. Differential demodulation has been adopted based on the technological constraints present at the time of designing these systems for baseband demodulation and therefore does not have the capability to combat inter-symbol-interference (ISI) typically introduced by multi-path fading.

SUMMARY OF THE INVENTION

A communications system comprises a carrier recovery module that determines a carrier frequency offset of an input signal. A rotator module rotates the input signal to minimize the carrier frequency offset and generates a compensated signal. A correlator module correlates the compensated signal with a unique word to obtain a timing correction. An equalizer module equalizes the compensated signal based on the timing correction and generates an equalized signal.

In other features, an analog to digital converter converts an analog input signal to the input signal. A decimation filter communicates with the analog to digital converter and provides the input data at three times a symbol rate. The carrier recovery module comprises an angle calculator module that detects a time division duplex burst. The carrier recovery module comprises a burst detector module that detects a burst in response to a preamble of the input signal. The carrier recovery module comprises an angle calculator module that determines an angle of the input signal in response to a coordinated rotation digital computer (CORDIC) module. The carrier recovery module comprises a carrier offset calculator module that generates a rotation angle. The rotator module generates the compensated signal based on the rotation angle.

In other features, the equalizer module performs feed forward and decision feedback equalization. The feed forward and decision feedback equalization adjusts at least one coefficient based on the timing correction. A tracker module adjusts the equalized signal to compensate for frequency drift. The communication system employs time division multiple access (TDMA). A personal handy phone system comprises the communications system.

A communications system comprises an analog front end that converts an analog input signal into a digital data input signal. A decimation filter generates an accelerated input signal at N times a symbol rate of the digital data input signal. N is an integer greater than zero. A carrier recovery module determines a rotation angle for minimizing a carrier frequency offset based on the accelerated input signal. A rotator module rotates the accelerated input data signal based on the rotation angle to form a rotated signal. An equalizer module equalizes the rotated signal.

In other features, N is equal to three. The carrier recovery module comprises a sliding window summing buffer. The carrier recovery module comprises an angle calculator module including a coordinated rotation digital computer (CORDIC) module. The angle calculator module performs input scaling for the CORDIC module and output rescaling. The CORDIC module includes an angle accumulator an initializer that initializes the angle accumulator.

In other features, the communication system employs time division multiple access (TDMA). A personal handy phone system comprises the communications system. The carrier recovery module comprises a burst detector module that detects a time division duplex burst. The burst detector module detects a burst based on a preamble of the digital input signal.

A communications system comprises carrier recovery means for determining a carrier frequency offset of an input signal. Rotator means rotates the input signal to minimize the carrier frequency offset and generates a compensated signal. Correlator means correlates the compensated signal with a unique word to obtain a timing correction. Equalizer means equalizes the compensated signal based on the timing correction and generates an equalized signal.

In other features, analog to digital converting means converts an analog input signal to the input signal. Decimation filter means for communicating with the analog to digital converting means provides the input data at three times a symbol rate. The carrier recovery means comprises angle calculator means for detecting a time division duplex burst. The carrier recovery means comprises burst detector means for detecting a burst in response to a preamble of the input signal.

In other features, the carrier recovery means comprises angle calculator means for determining an angle of the input signal in response to a coordinated rotation digital computer (CORDIC) module. The carrier recovery means comprises carrier offset calculator means for generating a rotation angle. The rotator means generates the compensated signal based on the rotation angle. The equalizer means comprises feed forward equalizer means for equalizing and decision feedback equalizer means for equalizing. The feed forward and decision feedback equalizer means adjust at least one coefficient based on the timing correction. Tracker means adjusts the equalized signal to compensate for frequency drift.

In other features, the communication system employs time division multiple access (TDMA). A personal handy phone system comprises the communications system.

A communications system comprises converting means for converting an analog input signal into a digital data input signal. Decimation means generates an accelerated input signal at N times a symbol rate of the digital data input signal, wherein N is an integer greater than zero. Carrier recovery means determines a rotation angle for minimizing a carrier frequency offset based on the accelerated input signal. Rotator means rotates the accelerated input data signal based on the rotation angle to form a rotated signal. Equalizer means equalizes the rotated signal.

In other features, N is equal to three. The carrier recovery means comprises sliding window summing buffer for summing. The carrier recovery means comprises angle calculator means for calculating that includes a coordinated rotation digital computer (CORDIC) module. The angle calculator means performs input scaling for the CORDIC module and output rescaling. The CORDIC module includes angle accumulating means for accumulating and initializing means for initializing the angle accumulating means.

In other features, the communication system employs time division multiple access (TDMA). A personal handy phone system comprises the communications system. The carrier recovery means comprises burst detector means for detecting a time division duplex burst. The burst detector means detects a burst based on a preamble of the digital input signal.

A method for operating a communications system comprises determining a carrier frequency offset of an input signal; rotating the input signal to minimize the carrier frequency offset and generating a compensated signal; correlating the compensated signal with a unique word to obtain a timing correction; and equalizing the compensated signal based on the timing correction and generating an equalized signal.

In other features, the method comprises converting an analog input signal to the input signal. The method comprises sampling the input data at three times a symbol rate. The method comprises detecting a time division duplex burst. The method comprises detecting a burst in response to a preamble of the input signal. The method comprises determining an angle of the input signal in response to a coordinated rotation digital computer (CORDIC) module. The method comprises generating a rotation angle. The method comprises generating the compensated signal based on the rotation angle. The method comprises using feed forward equalizing and decision feedback equalizing to adjust at least one coefficient based on the timing correction. The method comprises adjusting the equalized signal to compensate for frequency drift.

A method for operating a communications system comprises converting an analog input signal into a digital data input signal; generating an accelerated input signal at N times a symbol rate of the digital data input signal, wherein N is an integer greater than zero; determining a rotation angle for minimizing a carrier frequency offset based on the accelerated input signal; rotating the accelerated input data signal based on the rotation angle to form a rotated signal; and equalizing the rotated signal.

In other features, N is equal to three. The determining comprises using sliding window summing. The determining comprises calculating the rotation angle using a coordinated rotation digital computer (CORDIC) module. The method comprises performing input scaling for the CORDIC module and output rescaling. The method comprises detecting a burst based on a preamble of the digital input signal.

In still other features, the systems and methods described above are implemented by a computer program executed by one or more processors. The computer program can reside on a computer readable medium such as but not limited to memory, non-volatile data storage and/or other suitable tangible storage mediums.

A computer program executed by a processor for operating a communications system comprises determining a carrier frequency offset of an input signal; rotating the input signal to minimize the carrier frequency offset and generating a compensated signal; correlating the compensated signal with a unique word to obtain a timing correction; and equalizing the compensated signal based on the timing correction and generating an equalized signal.

In other features, the computer program comprises converting an analog input signal to the input signal. The computer program comprises sampling the input data at three times a symbol rate. The computer program comprises detecting a time division duplex burst. The computer program comprises detecting a burst in response to a preamble of the input signal. The computer program comprises determining an angle of the input signal in response to a coordinated rotation digital computer (CORDIC) module. The computer program comprises generating a rotation angle. The computer program comprises generating the compensated signal based on the rotation angle. The computer program comprises using feed forward equalizing and decision feedback equalizing to adjust at least one coefficient based on the timing correction. The computer program comprises adjusting the equalized signal to compensate for frequency drift.

A computer program executed by a processor for operating a communications system comprises converting an analog input signal into a digital data input signal; generating an accelerated input signal at N times a symbol rate of the digital data input signal, wherein N is an integer greater than zero; determining a rotation angle for minimizing a carrier frequency offset based on the accelerated input signal; rotating the accelerated input data signal based on the rotation angle to form a rotated signal; and equalizing the rotated signal.

In other features, N is equal to three. The determining comprises using sliding window summing. The determining comprises calculating the rotation angle using a coordinated rotation digital computer (CORDIC) module. The computer program comprises performing input scaling for the CORDIC module and output rescaling. The computer program comprises detecting a burst based on a preamble of the digital input signal.

In still other features, the systems and computer programs described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodi-

BRIEF DESCRIPTION OF THE DRAWINGS

The present disclosure will become more fully understood from the detailed description and the accompanying drawings, wherein:

FIG. 14A is a block diagram of the elements of the equalizer module;

FIG. 14B is a block diagram of the equalizer module coefficient updater;

FIG. 15 is a block diagram of the slow tracker module;

DETAILED DESCRIPTION

Figure 1:
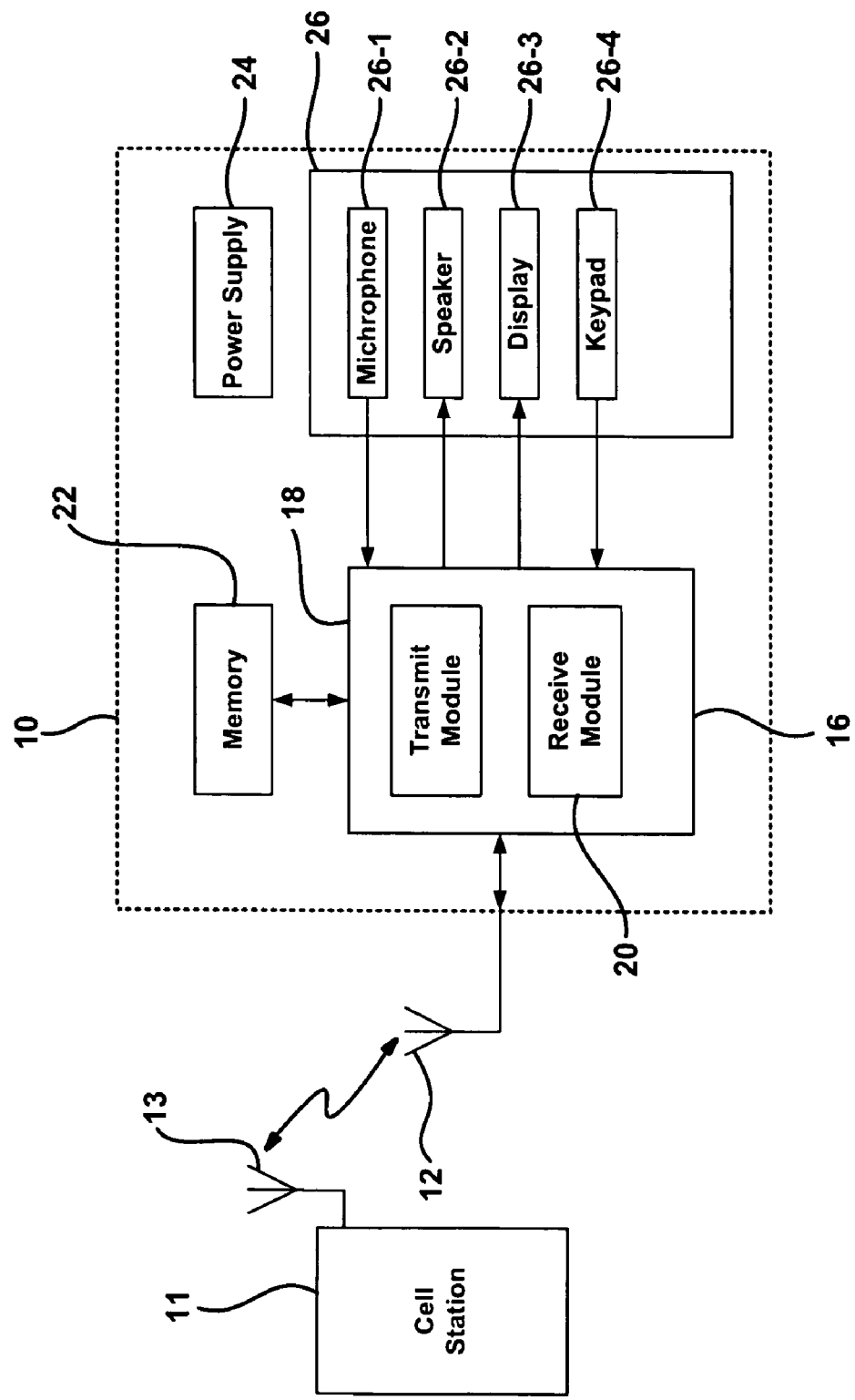
FIG. 1 is a functional block diagram of an exemplary personal handy-phone system (PHS) phone according to the prior art.
Figure 2:
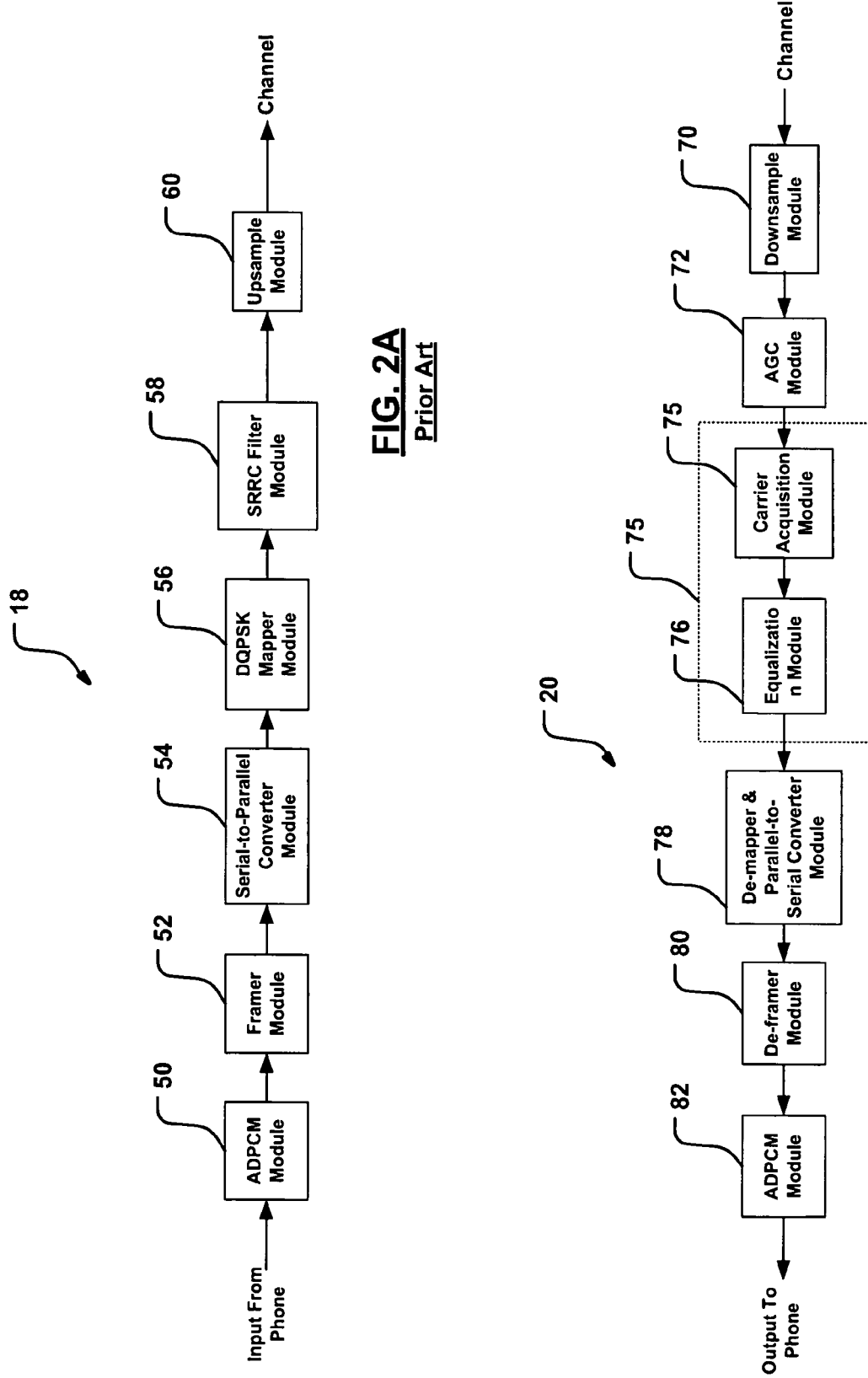
FIG. 2A is a functional block diagram of an exemplary transmitter used in a PHS phone of FIG. 1 according to the prior art.
FIG. 2B is a functional block diagram of an exemplary receiver used in a PHS phone of FIG. 1 according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is applicable to communications systems. For example, the present disclosure is applicable to wireless communications systems. The present disclosure is also applicable to time division multiple access (TDMA) systems. In the foregoing description, the present disclosure discusses a personal handy-phone system (PHS). However, the present disclosure is not meant to be limited to PHS or TDMA systems. The present disclosure is defined for an exemplary embodiment employed with a PHS communication system and standard (a 2G legacy mobile system).

Figure 3:
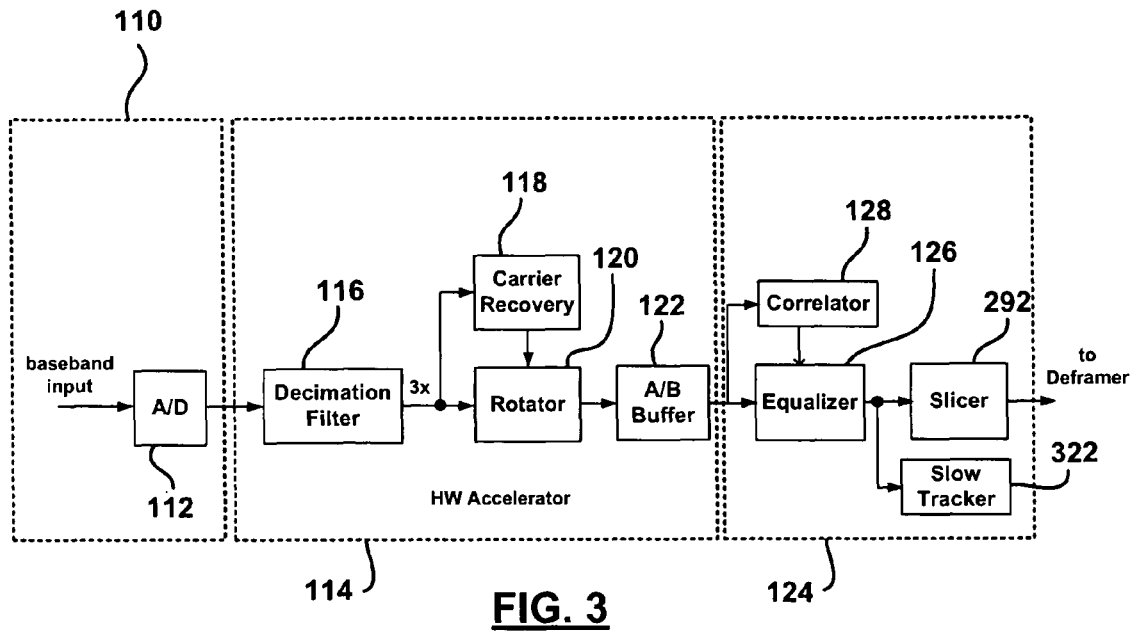
FIG. 3 is a block diagram of the elements employed in the current disclosure.

Referring now to FIG. 3, a block diagram of a portion of a receive data path for a personal station (PS) is illustrated. A more detailed description of each of the blocks in FIG. 1 is set forth below in corresponding figures. The analog front-end (AFE) section 110 includes an analog to digital converter 112 to convert the input signal from an analog input signal to a digital input signal. The converted digital signal is communicated to a hardware accelerator module 114. The hardware accelerator module 114 processes the digital input signal and generates a signal compensated for a carrier frequency offset.

The hardware accelerator module 114 includes a decimation filter 116 that forms an accelerated input signal at a multiple N of the symbol rate such as three times the symbol rate, e.g. 576 kHz. N is an integer greater than zero. The accelerated input signal is communicated to a carrier recovery module 118 from the decimation filter 116 and to a rotator module 120. The output of the rotator module 120 is communicated to a storage register 122 which, for the embodiment disclosed herein, includes a dual or A/B buffer register 122. The carrier recovery module 118 detects a burst and estimates the carrier frequency offset between received and transmitted signals, as will be described in further detail below.

The following rotator module 120 to compensate the carrier frequency to form a rotated signal. The rotated signals stored in the A/B buffer register 122 are communicated to a digital signal processor module (DSP) 124 that includes an equalizer module 126. An adaptive decision-directed equalizer module 126 is applied where the training sequence is a unique word (UW) in the burst. Therefore, an accurate position of UW is determined. This accurate determination allows the reduction of multipath interference and intersymbol interference. The correlation timing is acquired via a correlator module 128. The input data is correlated with the UW and, therefore, after a peak of the correlation result is detected, the UW location, with respect to timing in the burst data, is determined. The process of coherent detection is employed in the present disclosure even though the base-band modulation is DQPSK. Coherent detection of the kind set forth herein may have 3 dB better performance than the differential detection in prior systems.

In using coherent demodulation, the recovery of the carrier is important. The quality of the measurement impacts the performance of various function blocks at later stages. One carrier frequency recovery scheme is automatic frequency control (AFC). However, in the present PHS system, the data is transmitted in burst mode; therefore, the response time for AFC to be stable is relatively short, normally within a few to tens of symbols. Therefore, an open-loop carrier frequency estimation is employed in the present disclosure. Slow tracking circuitry 322 is then applied to follow the slow varying carrier characteristics.

In the coherent demodulation of PSK signals, carrier frequency offset due to either limited oscillator precision or the Doppler effect caused by moving vehicles, may cause a reduction in performance. In the PHS system, the system base station or cell station (CS) may have offset of up-to ±2 ppm and mobile or personal station (PS) may have offset of up-to ±5 ppm. Correcting the frequency offset in such demodulation will help improve receiver performance and reduce accuracy requirements on an oscillator, which reduces cost.

The carrier recovery module 118 of the PHS employed in the present disclosure has two basic functions: one is to detect a TDD (time division duplex) burst, and the other is to estimate the carrier frequency offset between the received and the transmitted signal. This estimated carrier offset is employed either to drive a rotator module 120 to compensate the offset in received signal or to drive an AFC to correct frequency of the local carrier generator.

For a time division duplex system like PHS, synchronization between the personal station and the cell station is one step in building a communication link. When the system is powered on for the first time, there is no timing information. The personal station seeks the timing information and, more specifically, bit timing from the received signal. Therefore, for the personal station to acquire the timing information from the cell station, it needs to search for the proper indication. In PHS, the preamble signal (PR) in the control slot has appropriate characteristics to be used to detect such a burst (or slot).

Figure 4:
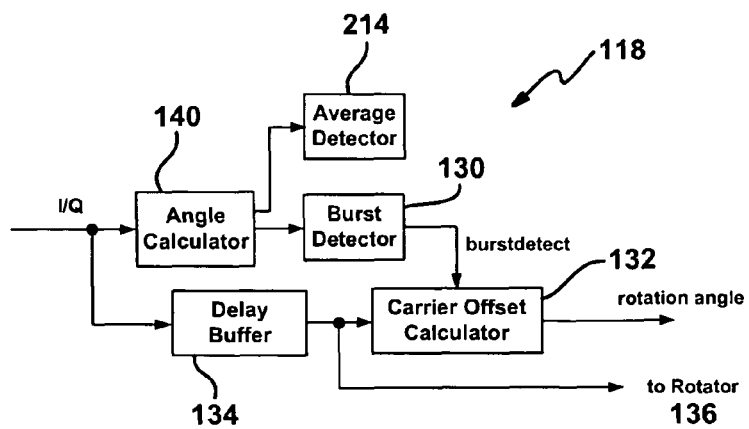
FIG. 4 is a block diagram of the elements of the carrier recovery section.

Referring now to FIG. 4, the carrier recovery module 118 includes a burst detector module 130 and a carrier offset calculator module (COC) 132. The burst detect flag (burstdetect) from the burst detector module 130 triggers the signals from the delay buffer 134 to pass to the COC 132 to derive the carrier offset frequency. The resulting offset is transformed to a rotation angle to pass to rotator module 120 of FIG. 1 so that the frequency offset can be compensated in the received signals. The carrier recovery module 118 is controlled by carrier recovery control registers and can be bypassed by setting the proper register bit. A disclosure of an embodiment for the control registers is provided in copending U.S. application Ser. No. 60/766,591, entitled TDMA CONTROLLER FOR A TDD WIRELESS COMMUNICATION SYSTEM filed Jan. 30, 2006, which is hereby incorporated by reference in its entirety.

A CORDIC (coordinate rotation digital computer) angle calculator module 140 performs angle calculation. CORDIC is an iterative solution for a wide range of functions, such as sin, cosine, tangent, arctangent, vector magnitude, etc. CORDICs are best known for their hardware implementation efficiency since they only use shifts and adds instead of multiplications.

The CORDIC algorithm is derived from the general rotation transform, $$x'=x\cos(\theta)-y\sin(\theta)=\cos(\theta)\cdot(x-y\cdot\tan(\theta))$$

$$y'=x\sin(\theta)+y\cos(\theta)=\cos(\theta)\cdot(y+x\cdot\tan(\theta))$$

If $\theta$ is defined as $\theta=\arctan(1/2^i)$, then the multiplication of $\tan(\theta)$ can be reduced to a shift. An arbitrary angle rotation may be achieved by performing a series of elementary rotations. Each rotation direction is decided by $d_i$, where $d_i=\pm 1$. The equations of a series rotations are $$x_{i+1}=k_i\cdot(x_i-d_i\cdot y_i\cdot 2^{-i}),$$

$$y_{i+1}=k_i\cdot(y_i+d_i\cdot x_i\cdot 2^{-i}),$$

where $k_i=1/\sqrt{1+2^{-2i}}$ and $d_i=\pm 1$.

The accuracy of CORDIC angle calculator module 140 depends on both the bit precision of the input data and the iteration times. In general, the CORDIC algorithm produces one additional bit of accuracy if the iteration time or input bit precision is increased by one.

An angle calculator module 140 for arctan(I/Q) can be realized using the following iterative equations, $$x_{i+1}=x_i-d_i\cdot y_i\cdot 2^{-i},$$

$$y_{i+1}=y_i+d_i\cdot x_i\cdot 2^{-i},$$

and $z_{i+1}=z_i-d_i\cdot\arctan(2^{-i})$, where $d_i=1$ if $y_i>0$, $d_i=-1$ otherwise.

The initial value of the equations are $x_0=I$, $y_0=Q$ and $z_0=0$. Then after n iterations, $x_n=A_n\sqrt{I^2+Q^2}$, $y_n=0$, $z_n=\arctan(I/Q)$, where $$A_n = \prod_n \sqrt{1+2^{-2i}}.$$

For the example set forth herein, the number of iterations is chosen as n=12 and the arctangent table employed is 12×16. The form of the table is shown in Table 1 where π can be represented as 0 x 10000.

TABLE 1

| Arctangent Table (Q.16) | Bit Range | Value (unsigned) | Values Represented (per π) |
|---|---|---|---|
| [0] | [15:0] | 16384 | Atan (1) = ¼ * π |
| [1] | [15:0] | 9672 | Atan (½) |
| [2] | [15:0] | 5110 | Atan (¼) |
| [3] | [15:0] | 2594 | Atan (⅛) |
| [4] | [15:0] | 1302 | Atan (1/16) |
| [5] | [15:0] | 652 | Atan (1/32) |
| [6] | [15:0] | 326 | Atan (1/64) |
| [7] | [15:0] | 163 | Atan (1/128) |
| [8] | [15:0] | 81 | Atan (1/256) |
| [9] | [15:0] | 41 | Atan (1/512) |
| [10] | [15:0] | 20 | Atan (1/1024) |
| [11] | [15:0] | 10 | Atan (1/2048) |

Figure 5:
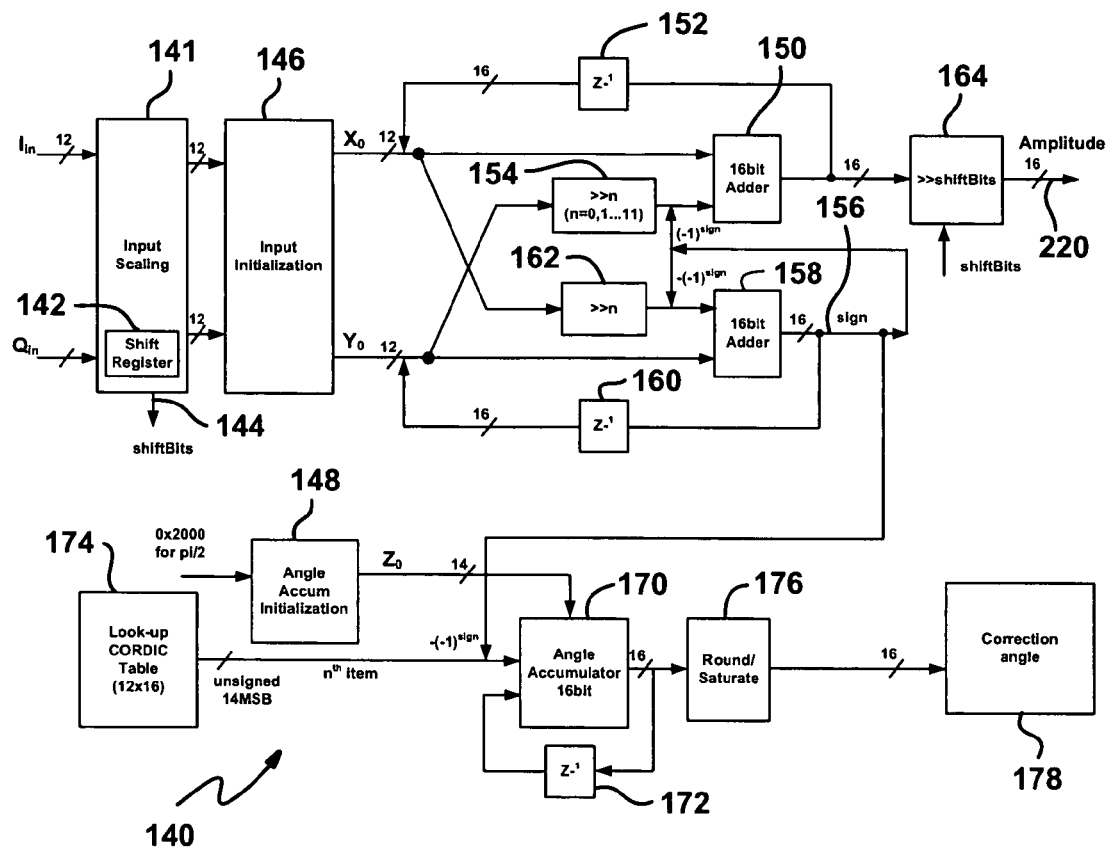
FIG. 5 is a block diagram of the elements of the angle calculator module.

Referring now to FIG. 5, an exemplary CORDIC angle calculator module 140 is shown. To maximize accuracy of the CORDIC, an input scaling device 141 provides a scaling function to the input data and scales the input data to a full scale such as 12 bits. The scaling process is fully described in copending application Ser. No. 11/306,795 entitled Improved Precision CORDIC Processor which was filed on Jan. 30, 2006, which is hereby incorporated by reference in its entirety.

The CORDIC angle calculator module 140 receives the I and Q data from the decimation filter and incorporates the scaling function for the input. The scaling function may incorporate a shift register 141 to shift the I and Q data and provides a shift bits output 144, which is employed in re-scaling the amplitude output, as will be described subsequently. An input initialization module 146 and a companion angle accumulation initialization module 148 may be employed for angle data larger than π/2.

Figure 6:
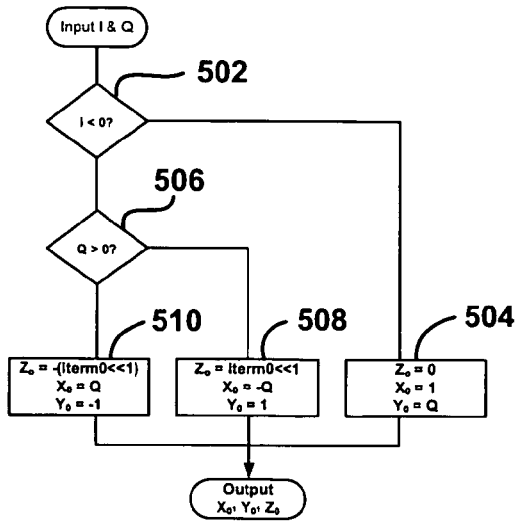
FIG. 6 is a flow chart of the angle accumulator initialization in the angle calculator module.

Referring now to FIG. 6, the initialization function is illustrated. The input I and Q are evaluated and if I is not less than 0, block 502, the provided output is shown in block 504 as Z0=0, X0=I and Y0=Q. If I is less than 0, the value of Q is determined, block 506, and if Q is 0 or less, the provided output is shown in block 508 as Z0 is item0, with item0 defined as π/2, or equal to 2 times element [0] of Table 1, left shifted one bit, X0=−Q and Y0=I. If Q is greater than 0, the provided output is shown in block 510 with Z0 equal to −(item0) left shifted one bit, X0=Q and Y0=−I.

Referring back to FIG. 5, the CORDIC angle calculator module 140 incorporates a 16 bit adder 150 receiving the 12 bit input X0 and prior increment data stored in register 152. A shift register 154 receives the Y0 input and right shifts the data n bits where n=0, 1 . . . 111 with a sign set based on a sign output 156. Similarly, a second 16 bit adder 158 receives the 12 bit input Y0 and prior increment data from register 160. A second shift register 162 receives X0 and right shifts n bits for input to the second adder 158, again with its sign set based on the SIGN output. The output of the second adder 158 determines the sign for the first shift register output as $(-1)^{sign}$ and the sign for the second shift register output as $-(-1)^{sign}$. The output of the first adder 150 is rescaled in shift register 164 using the shift bits output from the input scaling. The rescaled data is then employed for calculation of the signal amplitude for further use in carrier recovery 118 as will be described subsequently.

Actual angle calculation is performed based on the angle accumulator initialization method previously described in FIG. 5. The angle accumulation method is an input to the angle accumulator module 170 along with the prior sample stored in register 172 and the input from the CORDIC lookup table 174 which is unsigned. The sign of the table input to the angle accumulator 170 is determined based on the SIGN ouput from the second adder 158, previously described, with the sign determined as $-(-1)^{sign}$. The output from the angle accumulator is then operated on in round and saturate module 176 to maintain the angle in the range of +/−π and output as the correction angle 178 for use in carrier recovery and initial signal rotation.

Referring back to FIG. 4, the burst detector module 130 is employed to detect a TDD burst. In the PHS, the preamble signal (PR) in the control slot provides a suitable signature for detection. For a received in-band signal, $$S_r(t)=A(t)\cos(\Delta\omega_c t+\theta'(t)+\phi)+n(t),$$

where $$A(t) = \sum_k g(t-kT),\ g(t)$$

is a raised-cosine pulse, $\Delta\omega_c$ is the carrier offset, $\theta'(t)$ is the receiver modulation phase, and $\phi$ is the fixed phase offset between transmitter and receiver, n(t) is white Gaussian noise. The phase signal of $S_r(t)$ is simply phz(t)=2πΔft+θ(t)+φ if the difference between the transmitter modulation phase and receiver modulation phase is ignored.

After a single differentiation, the phase difference becomes phzDiff1(t)=phz(t)−phz(t−T)=2πΔfT+θ(t)−θ(t−T) . The single differentiated signal is a periodic signal centered at ¼π+2πΔfT with period of 2T, and the phase value is within $$\left[-\frac{\pi}{4}, \frac{3\pi}{4}\right].$$

After a double differentiation, the phase becomes phzDiff2(t)=phzDiff1(t)−phzDiff1(t−T)=θ(t)+θ(t−2T)−2θ(t−T). The double differentiated signal is a periodic signal centered at 0 and with period of 2T. The value of the signal is within [−π,π].

The burst detect algorithm of burst detector module 130 is derived by taking advantage of this characteristic of PR. Let $$sumPhase = \sum_{m=0}^{M-1} abs(phzDiff2(t-mT) + phzDiff2(t-mT-T)),$$

where M is the window length. M=16 for the embodiment described herein. The above equation can be simplified as $$sumPhase = \sum_{m=0}^{M-1} abs(\theta(t-mT) - \theta(t-mT-T) -$$
$$\theta(t-mT-2T) + \theta(t-mT-3T))$$
$$= \sum_{m=0}^{M-1} abs(phzDiff1(t-mT) - phzDiff1(t-mT-2T))$$

If sumPhase is less than a burst detect threshold ThB then a burst is detected. For exemplary embodiments, ThB=3*π.

Figure 7A:
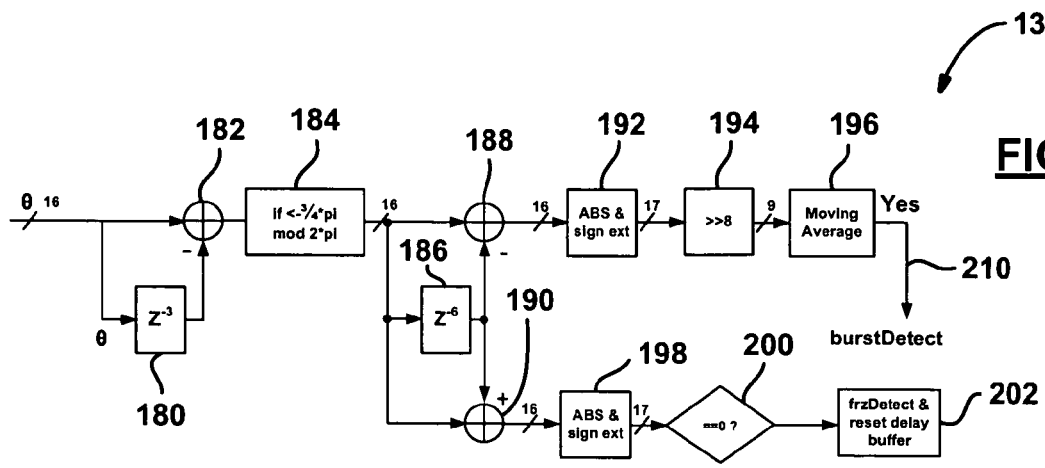
FIG. 7A is a block diagram of the elements of the burst detector module.

Referring now to FIG. 7A, a functional block diagram of the burst detector module 130 is shown. The angle θ in 16 bit format from the angle calculator module 140 is supplied to a delay buffer 180 and an adder 182 to have the angle value three prior to the current value subtracted. A modulo 2π operator 184 converts the value if the modified value is less than ¾π or greater than 5/4π. Delay buffer 186 supplies the value six prior for subtraction from the current value in adder 188 for a first interim value and addition to the current value in adder 190 for a second interim value. In the ABS and sign extension module 192, the absolute value of the first interim value is taken and the sign extended to 17 bits. Then the value is right shifted 8 bits in block 194 to a bit length of 9 bits. A moving average module 196 provides a moving average for burst detection as will be described in greater detail subsequently.

In the ABS and sign extension module 198, the absolute value of the second interim value is taken and the sign extended to 17 bits. If the resulting value is approximately equal to 0, in block 200, a freeze detector signal is issued and the delay buffer reset in block 202.

Figure 7B:
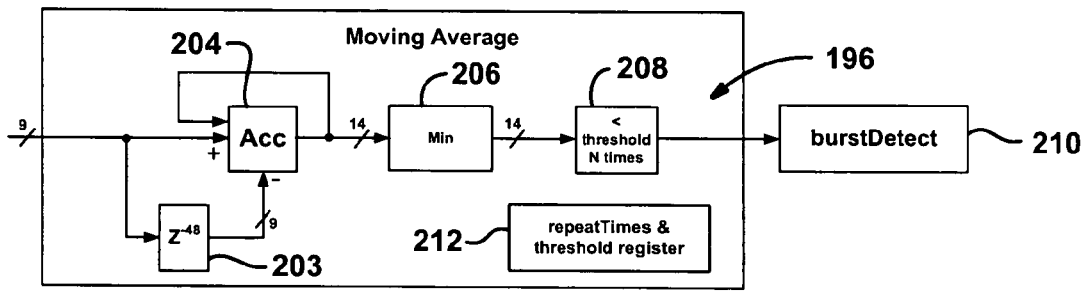
FIG. 7B is a block diagram of the moving average modules of FIG. 7A.

Referring now to FIG. 7B, the moving average module 196 employs a 14 bit accumulator 204 which receives the 9 bit interim value and sums the previous value while subtracting the 48$^{th}$ prior interim 9 bit value from block 203. The 14 bit value is processed by accumulating all 9 bit data stored in a delay buffer array 206 to find the minimum among three phases by comparison with the threshold value. If the value is less than the threshold N in block 208, the burst detect signal 210 is issued. A repeat time and threshold register 212 is provided for values of ThB and N which are reconfigurable in real time as a control register setting.

Figure 8:
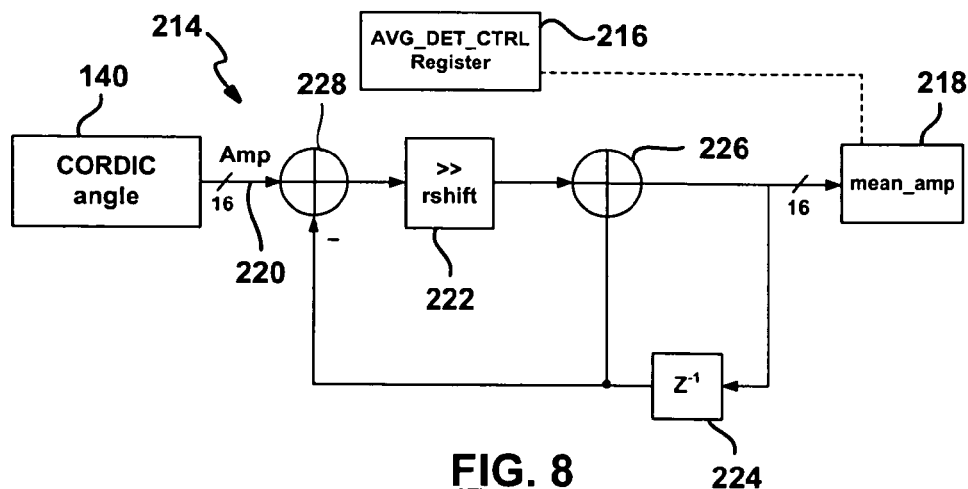
FIG. 8 is a block diagram of the elements of the average detector module.

Referring now to FIG. 8, the average detector module 214 of FIG. 4 is illustrated in further detail. The average detector module 214 employs the amplitude output, $A=\sqrt{I^2+Q^2}$, from the CORDIC angle calculator module 140 to provide an average signal value to set a programmable gain amplifier (PGA) in the AFE so that the signals entering ADC 12 can be in the proper range, i.e., neither too small resulting in lost precision nor too large which might potentially be clipped. Setting of the PGA gain is delicate especially in a wireless environment.

A derived amplitude from the CORDIC angle calculator module 140 is used to perform the average detection. The calculated instant amplitude value is smoothed through an alpha filter $E\{A\}_n=(1-\alpha)E\{A\}_{n-1}+\alpha \cdot A_n$, where α is a register stored value. After about 20-30 symbols (60-90 samples), the average value is a good prediction of true average signal.

The average detection is reset at each burst using the control register 216 and the output derived average is written to a mean amplitude register 218. The input to the average detector module 214 is provided by the amplitude output 220 of the CORDIC angle calculator module 140 which is entered into a shift register 222. Feedback through a register 224 is summed in a summing block 226 with the output as the mean amplitude and inverted for summing in summing block 228 with the input to the shift register.

Since the instant amplitude is calculated as a by-product of angle calculation, the input to the average detector module 214 is continuous during the preamble searching stage. However, it does not produce meaningful value since the burst boundary is not clear. Therefore, the average detector module 214 is disabled during burst search using the control register 215. When carrier recovery enters broadcast control channel (BCCH) searching mode, the burst boundary is somewhat clearer. During this period, the average detector module 214 is triggered to begin processing for a time period during every burst, and the resulting value is sent to the DSP module 124 of FIG. 3 with the burst data indicating the respective cell station transmitted signal strength. The average detector module 214 is enabled and reset at the beginning of every burst. After one cell station is selected, the respective average value can be used to set a programmable gain amplifier.

Figure 9A:
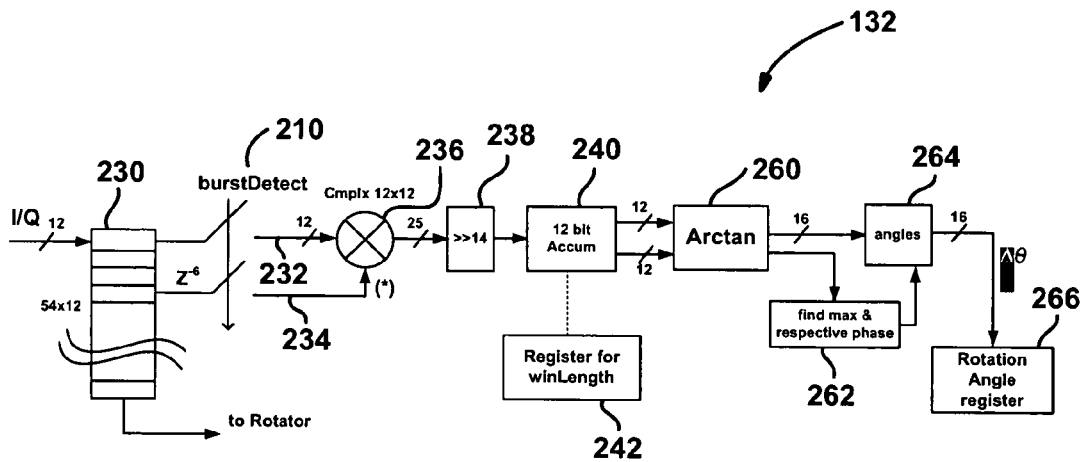
FIG. 9A is a block diagram of the elements of the carrier offset calculator module.

Referring now to FIG. 9A, one embodiment of the carrier offset calculator module 132 of FIG. 4 employs an open-loop carrier offset estimation algorithm for carrier recovery. The algorithm uses the characteristics of the preamble signal in the PHS system and directly estimates the carrier offset introduced by the oscillator and Doppler shift.

After modulation, the transmitting signal is represented as $$s(t) = \sum_k g_r(t - kT)\cos(\omega_c t + \theta(t)),$$

where $g_r(t)$ is the root-square raised cosine shaping filter, and $\omega_c$ is the carrier frequency in radius and T is the symbol time period. $\theta(t)$ is the modulation phase. For $\pi/4$-shift DQPSK modulation in PHS, $\theta(t)=\theta(t-T)+\Delta(t)$, and the relation between transmit symbol $(a_k, b_k)$ and $\Delta\theta(k)$ is listed in Table 2.

TABLE 2

| $(a_k, b_k)$ | $\Delta\theta(k)$ |
|---|---|
| (0, 0) | $\pi/4$ |
| (0, 1) | $3\pi/4$ |
| (1, 1) | $-3\pi/4$ |
| (1, 0) | $-\pi/4$ |

On the receiver side, a root-square raised cosine matched filter is applied and, hence, the base-band demodulated signal can be represented as $$s_r(t)=A(t)\cos(\Delta\omega_c t+\theta'(t)+\phi)+n(t),$$

where $$A(t) = \sum_k g(t - kT), \ g(t)$$

is raised-cosine pulse, $\Delta\omega_c=2\pi\Delta f_c$ is the carrier offset, $\theta'(t)$ is the receiver modulation phase and $\phi$ is the fixed phase offset between transmitter and receiver, and n(t) is white Gaussian noise.

Let $x(t)=E\{s_r(t)s_r^*(t-2T)\}$, where $s_r^*(t)$ is the conjugate of $s_r(t)$, resulting in $x(t)=\sigma_A e^{j[2\Delta\omega t+\theta(t)-\theta(t-2T)]}+N(t)$, where $\sigma_A=E\{A(t)^2\}$, and $N(t)=E\{s_r(t)n^*(t-2T)\}+E\{n(t)s_r^*(t-2T)\}+E\{n(t)n^*(t-2T)\}$ is the noise term and is ignored without loss of generality.

In PHS, the preamble signal is a periodic signal with a bit stream pattern of "1001," resulting in $\theta(t)-\theta(t-2T)=-\pi/2$. Let $x_I(t)=E\{A^2(t)\}\sin(2\Delta\omega_c T)$ and $x_Q(t)=E\{A^2(t)\}\cos(2\Delta\omega_c T)$, where $x_I(t)$, $x_Q(t)$ are the in-phase I and quadrature Q part of x(t), respectively.

If $x_I(t)$ and $X_Q(t)$ is being accumulated for N symbols, where N is the searching window, $$Acq_i(k) = \sum_{n=0}^{N-1} x_I(t_0 + kT_s + nT) \text{ and } Acq_q(k) = \sum_{n=0}^{N-1} x_Q(t_0 + kT_s + nT).$$

The amplitude is defined as $Amp(k)=Acq_i^2(k)+Acq_q^2(k)$, where $k=0, 1, \ldots m-1$ and $0\leq t_0 \leq T$ is the sampling time. $T_s$ is the sampling period where $T=mT_s$ and m is the number of the sample points within a symbol period.

After a burst is detected, the carrier offset $\Delta f_c$ can be estimated by finding a maximum amplitude $\max\{Amp(k)\}$ for each $k=0, 1, \ldots m-1$, over a window length N. Let $Amp(k_0)=\max\{Amp(k)\}$ correspond to each k, where $A_0=A^2(t_0+k_0 T_s+nT)$, $n=0, \ldots N-1$, then the carrier offset can be calculated as $$\Delta f_c = \Delta\omega_c/2\pi = \frac{1}{4\pi T}\tan^{-1}\left(\frac{Acq_i(k_0)}{Acq_q(k_0)}\right).$$

Carrier offset calculator module 132 is triggered by the burst detection flag 210. I/Q data is entered into delay buffer 230. For use in the present embodiment, the delay buffer is a portion of a sliding window summing arrangement for more efficient storage. Further disclosure of the delay buffer is provided in copending U.S. patent application Ser. No. 11/306,986, entitled STORAGE EFFICIENT SLIDING WINDOW SUM, filed on Jan. 18, 2006, which is hereby incorporated by reference in its entirety. Current data 232 and delayed data 234 are combined in a complex 12×12 multiplier 236 and processed through a shift register 238 to the accumulator 240. A window length register 242 controls the accumulator.

Figure 9B:
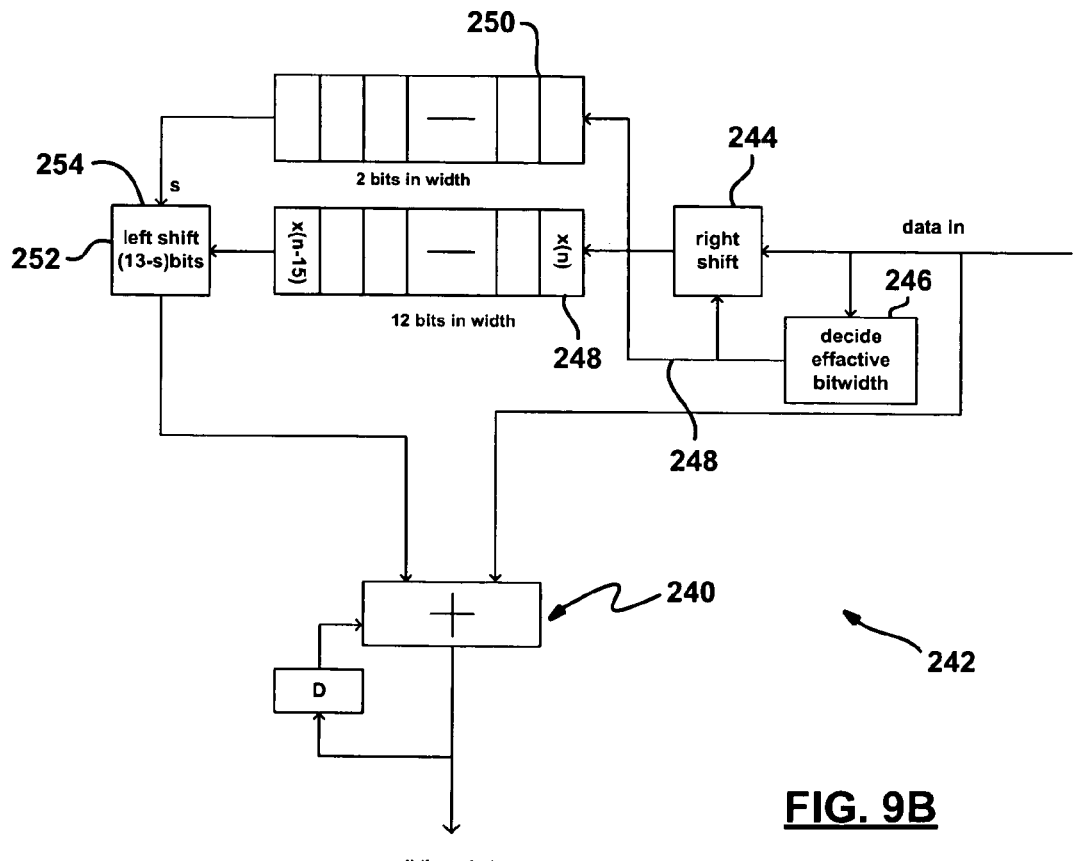
FIG. 9B is a block diagram of the elements of the sliding window sum employed in the conjunction with the carrier offset calculator module.

Referring now to FIG. 9B, the interaction of the accumulator 240 and window length register 242 are shown in additional detail. The input data is provided to a shift register 244 and operated on by an effective bit width determination function 246 that provides a two bit shift value output 248 to right shift register 244 by that value. In embodiments where the delay is incorporated into the accumulator 240, a first delay line of 12 bit width 248 receives the shifted value from register 244 while a second delay line of 2 bit width 250 receives the two bit shift value 248. At the output of the first delay line 248 the second shift register 252 receives the 12 bit width data and the two bit shift value at a shift input 254 to left shift by that value.

The output of the accumulator 240 is provided to an Arctan function module 260 that determines a maximum and respective phase in max/respective phase module 262 and the offset angle from the offset angle module 264. The offset angle is then provided to the rotation angle register 266. For an exemplary embodiment, the Arctan function 260 is realized using the improved CORDIC processor as described above, using the CORDIC twice for a reduced gate count; first to obtain the angle and absolute value of signal for burst detecting and second to get the angle for the rotator module 120.

This module can be bypassed by setting the control register. Another flag to control carrier offset calculator module 132 is the enable flag. During handover (TCH), the carrier offset calculator module 132 is no longer working. Therefore, the enable flag may be set to be disabled to save power. The data will then merely flow through the delay buffer into the rotator module 120.

Having now described the carrier recovery elements and returning to FIG. 3, the rotator module 120 cancels the effect of carrier frequency offset after the carrier is recovered. When carrier recovery module 118 detects a burst and derives the corresponding angle due to frequency offset, the rotator module 120 will be activated and start rotating the input signals according to the register values.

For a complex represented input signal $x=x_I+jx_Q$, if the rotation angle is $\theta$, then the output of the rotator module 120 is $y=y_I+jy_Q$, where $y_I=x_I\cos(\theta)-x_Q\sin(\theta)$ and $y_Q=x_I\sin(\theta)+x_Q\cos(\theta)$. Direct operation on the rotation involves four multiplications and two additions for each sample. Moreover, there is a calculation of sin( ) and cos( ) functions.

The CORDIC algorithm is again employed to realize vector rotation, which reduces cost by using only shifts and adds instead of multiplications. Iteration is again selected at 112 and the size of the CORDIC table is 16×12 allowing common table use with the CORDIC angle calculator module 140 in the carrier recovery system.

Figure 10:
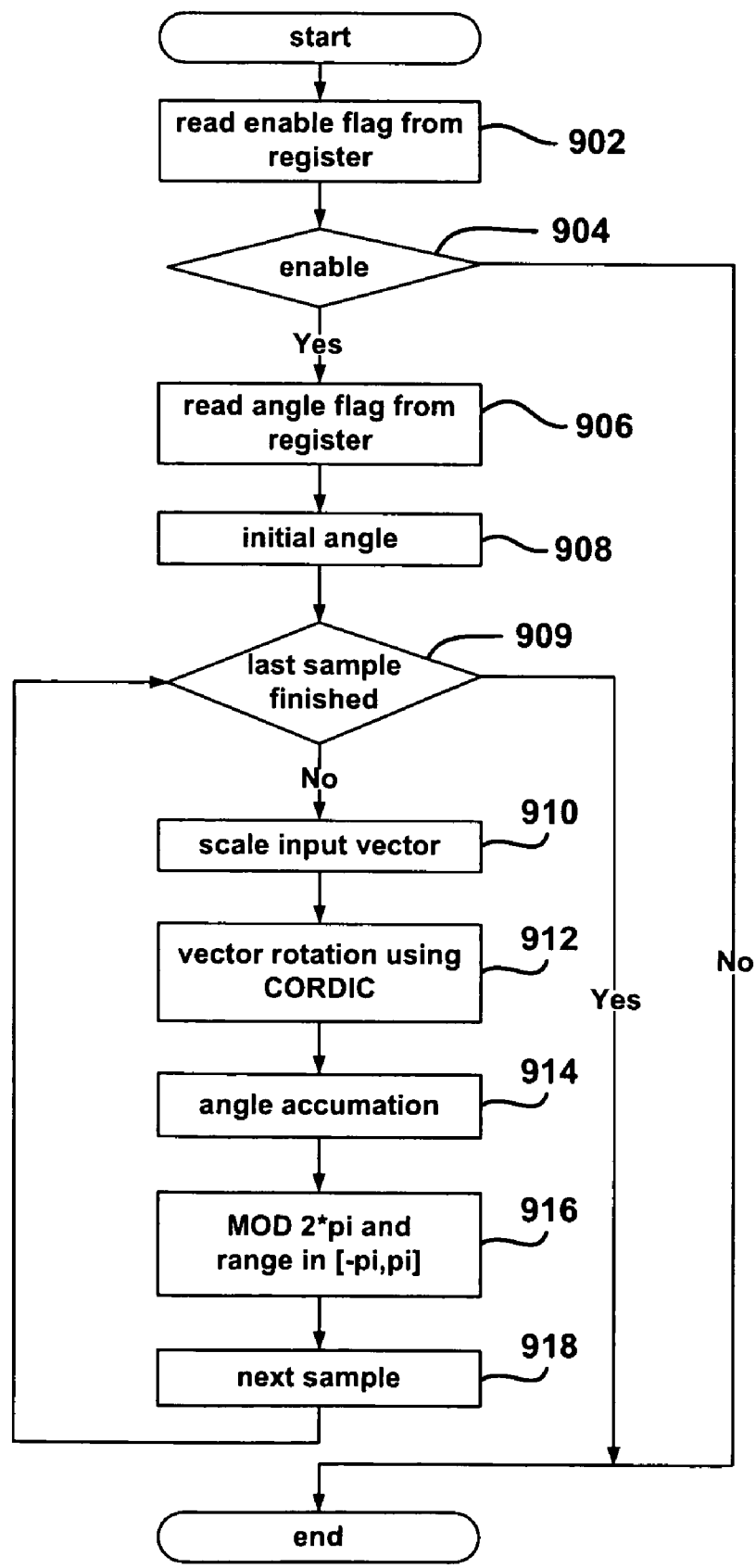
FIG. 10 is a flow chart of the rotator module operation.

Basic operation of the rotator module 120 is described in FIG. 10 wherein the enable flag is read from the control register in block 902 and, if enabled, in block 904, reads the angle from the rotation angle register in block 906 and sets the initial angle in block 908, as will be described in greater detail subsequently. In block 909 the method continues into block 910 if the last sample is not finished. If the last sample is finished in block 909 the system ends. The input vector is scaled in block 910 and the vector rotation is accomplished using the CORDIC in block 912. The angle is accumulated in block 914 in basic bit form and as modulo $2\pi$ from $-\pi$ to $\pi$ and the next rotation angle is generated in block 916. Thereafter, the next sample is received for processing 918. The system then proceeds to 909 to repeat blocks 910-918 until the last sample is finished.

For an exemplary embodiment, the phase is signed 17 bit data and the accumulator is 18 bits in width. The operation which occurs is

```
Phacc += phase_in          //accumulator
Phacc = phacc & 0x1ffff    //select 17 bits
If (phacc > π ) {Phacc = ((-1)<<17) | phacc    //mode}
```

12 cycles are required for one data rotation in the current embodiment based on the input signal 12 bit width.

Figure 11:
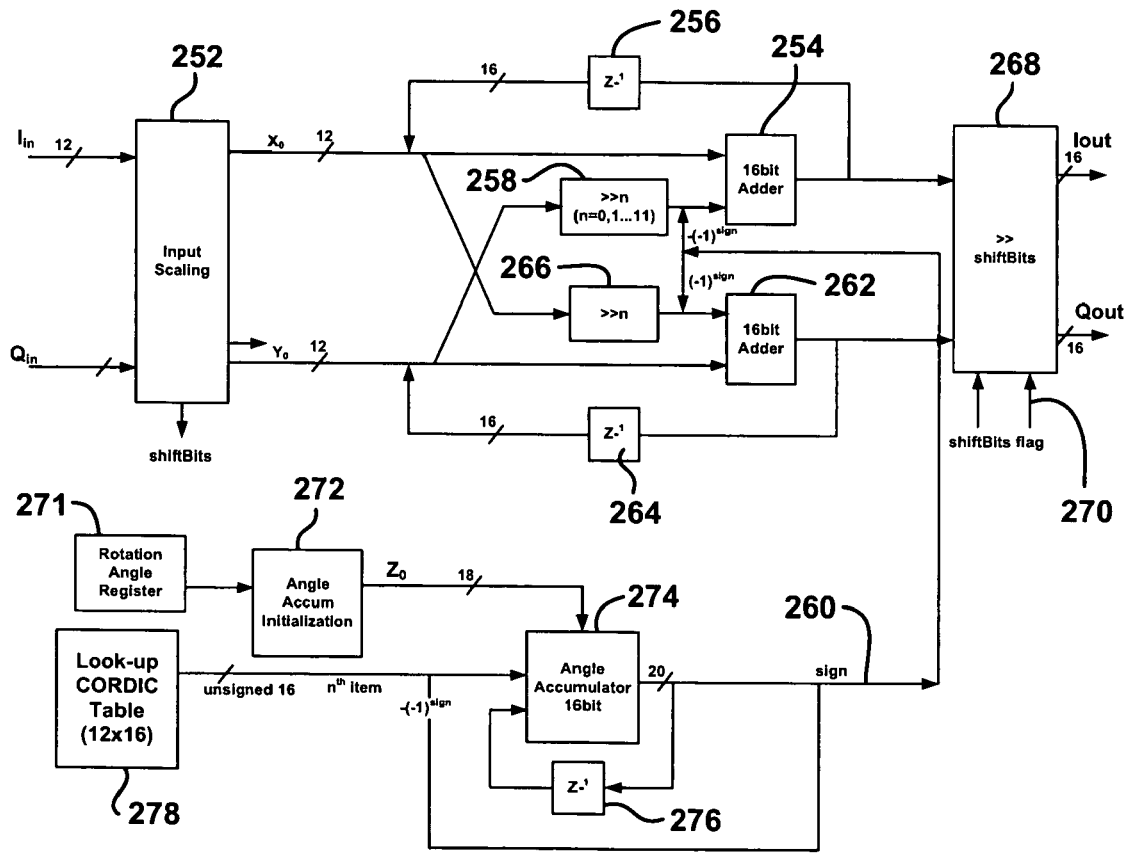
FIG. 11 is a block diagram of the elements of the rotator module.

Referring now to FIG. 11, a physical implementation of the CORDIC rotator module 120 is shown. I and Q input are provided to an input scaling module 252 with a ShftBits output for subsequent rescaling. A 16 bit adder 254 receives the 12 bit input X0 and the prior increment data stored in register 256. A shift register 258 receives the Y0 input and right shifts the data n bits where n=0, 1 ... 11 with a sign set based on the SIGN output 260. Similarly, a second 16 bit adder 262 receives the 12 bit input Y0 and prior increment data from register 264. A second shift register 266 receives X0 and right shifts n bits for input to the second adder 262, again with its sign set based on the SIGN output. SIGN determines the sign for the first shift register output as $-(-1)^{sign}$ and the sign for the second shift register output as $(-1)^{sign}$. The outputs of the first adder 254 and second adder 262 are rescaled in shift register 268 using the ShftBits output from the input scaling. A FLAG 270 based on the angle accumulator initialization, described previously, is output from the angle accumulator initialization module 212. The FLAG is 1 when the input angle>pi/2, the FLAG is −1 when the input angle<−pi/2; otherwise, FLAG is 0. The rescaled data is then the output I and Q for data communication.

SIGN calculation is achieved based on input $\theta$ from the rotation angle register 271 with an angle accumulator initialization module 272, which is an input to the angle accumulator module 274 with the prior sample stored in register 276 and the new input from the CORDIC lookup table 178, which is unsigned. The sign of the table input to the angle accumulator is determined based on the SIGN ouput from angle accumulator 274, with the sign determined as $-(-1)^{sign}$. The output from the angle accumulator also provides the SIGN for operation in the first and second adder as previously described.

Figure 12:
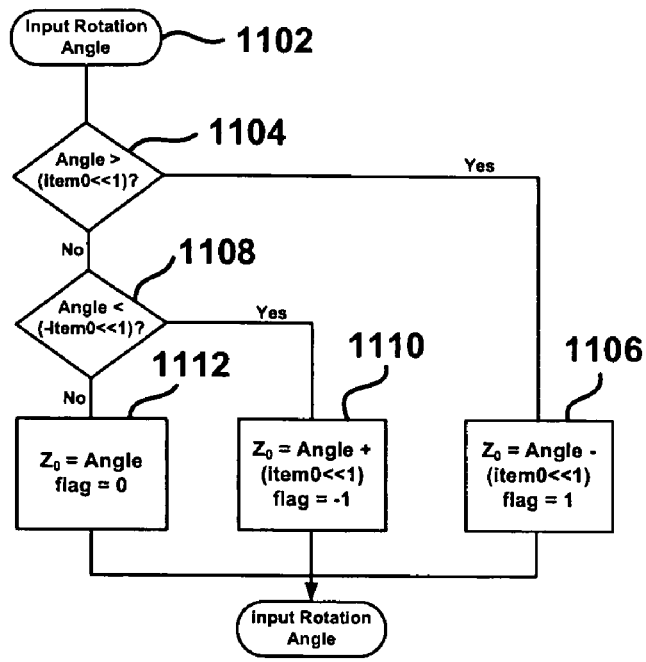
FIG. 12 is a flow chart of the angle accumulator initialization in the rotator module.

Referring now to FIG. 12, a method for operating angle accumulator initialization module 272 for the CORDIC rotator module 120 is shown. The rotation angle, $\theta$, is obtained in block 1102. If the rotation angle is greater than item0 shifted left one bit in block 1104, the resulting Z0 input in block 1106 is the input angle, $\theta$, minus item0 left shifted one bit and the FLAG is set to one. In step 1104, if the angle is not greater than item0 shifted left one bit, step 1108 is performed. If the input angle is less than −item0 left shifted one bit in block 1108, the resulting Z0 input from block 1110 is the input angle plus item 0 left shifted one bit and the FLAG is set to −1. In block 1108, if the angle is not greater than −item0 left shifted one bit, Z0 is set equal to the input angle, $\theta$, and FLAG is set to 0 in block 1112.

The operation of the hardware accelerator module 114 results in the ability of the present disclosure to employ an adaptive equalizer module 126 and correlator as previously described. In the receiver path, the signal after the rotator module 120 is considered to be almost offset-free and, therefore, correlation between the signal and a unique word (UW) can accurately identify the UW position allowing exact bit-timing to be derived. In a control slot, UW has a 32 bit length, and in communication slot, UW has a 16 bit length. The correlation between the signal and UW may be done at three times the symbol rate since the received signal is sampled at three times the symbol rate. However, to save processing power and memory space, it may be simplified to one times the symbol rate. Therefore, for a signal at three times the symbol rate, every sample in a symbol will do a symbol rate correlation with UW.

Figure 13:
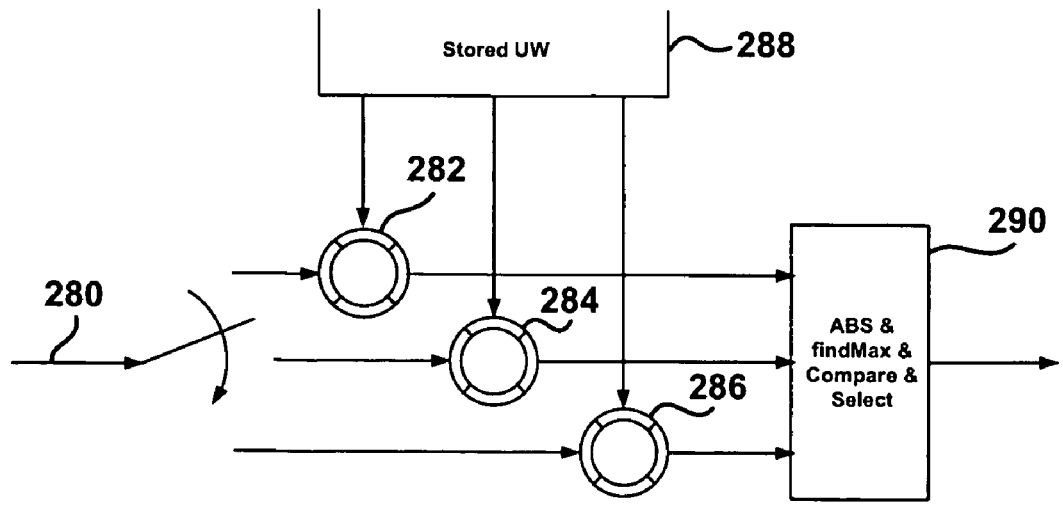
FIG. 13 is a block diagram of the elements of the correlator.

Referring now to FIG. 13, an exemplary one times the symbol rate correlator for the present disclosure is shown. A switch 280 operating at three times the symbol rate places three samples in comparators 282, 284 and 286, which compare a stored UW 288 and provide an output 290 for determining an absolute value, finding a maximum, comparing the UW and selecting the incoming UW signal for training. The one or used of these values corresponds to a correlation timing used by the equalizer module 126.

Determining a maximum for the positioning of UW for exact timing determination is disclosed in copending U.S. patent application Ser. No. 11/417,778 entitled METHOD FOR TIMING DETECTION filed on May 4, 2006, which is hereby incorporated by reference in its entirety.

Referring now to FIG. 14A, one example of the equalizer module 126 incorporated with a π/4 DQPK slicer module 292 in the DSP module firmware 124 (of FIG. 3) is shown. Data entering the equalizer module 126, such as the correlation timing with the unique word (UW) and the rotated signal, is operated on by a six-tap Feed Forward Equalizer (FFE) convolution filter 294 at three times the symbol rate. The filtered data is provided to a 14 bit shift register 296 which provides input through adder 298 to the slicer module 292. Feedback from the slicer module 292 is operated on by a 1-tap Decision Feedback Equalization (DFE) convolution filter 300 at the symbol rate and a 15 bit shift register 302 for input into the adder 298. The output of the slicer module 292 and the adder are summed in a second adder 304 to create an error signal (err) 306. The error signal 306 is provided to a coefficient update module 308 which then updates the coefficients for both the FFE filter 294 and DFE filter 300.

Referring now to FIG. 14B, coefficient update module 303 is shown in further detail. The error signal for the sample n is provided to a multiplier 310. The error signal of the sample n of the FFE filter (FFE ln(n)) is the other input to multiplier 310. A 13 bit shift register 312 receives the output of the multiplier 310 and provides the input to an adder 314 which sums the prior coefficient of the FE filter (FFE Coef (n−1)) to provide the new coefficient FFE Coef(n). Similarly for the DFE filter, the error signal for sample n is provided to a second multiplier 316 with DFE ln(n) as the other input. A 14 bit shift register 318 receives the output of the multiplier 316 and provides the input to an adder 320 which sums the prior coefficient FFE Coef (n−1) to provide the new coefficient FFE Coef(n). Thus, the bit timing is adjusted based upon the correlation timing determined in the correlator.

Referring now to FIG. 15, the slow tracker module 322 of FIG. 1 tracks the variations in carrier frequency offset due to the instability of the crystal oscillator and also to make minor adjustment in carrier frequency if the initial offset calculation is not accurate enough.

The unique word (UW) and preamble (PR) provide symbol sequences for deriving the residue offset due to a prior knowledge of their phases. The length of PR and UW may not provide enough accuracy alone. Therefore, the output of equalizer module 126 is employed.

For each TDD burst, the initial phase is unknown and, therefore, the initial phase, PR and UW, are unknown due to π/4-DQPSK modulation. Let $r(t)=a(t)e^{j2\pi ft+\phi(t)+\theta_0+\theta_n(t)}$ be received complex signal, where a(t) is the envelope, φ(t) is the symbol phase provided the initial phase is 0. And $\theta_0$ is the initial phase, $\theta_n(t)$ is the noise phase.

After the first rotator module 120, the initial phase $\theta_0$ and estimated frequency offset phase 2πΔft are removed, provided that $\theta_0$ can be derived which will be described subsequently, $r1(t)=r(t)*e^{-j(\theta_0+2\pi\Delta ft)}=a(t)e^{j(\phi(t)+2\pi\Delta f_e t+\theta_n(t))}$, where $\Delta f_\epsilon$ is the uncorrected residue offset, r2(t) is the signal after the information-bearing phase φ(t) is removed, $r2(t)=r1(t)*e^{-j\phi(t)}=a(t)e^{j(2\pi\Delta f_e t+\theta_n(t))}$.

The quadrature part of r2(t) is therefore $r2q(t)=a(t)\sin(2\pi\Delta f_\epsilon t+\theta_n(t))$. Properly choosing an average window can smooth out the noise phase. A smoothing window of six symbols is employed in the embodiment of the invention disclosed herein. Therefore, $$sumq(t) = \sum_{n=0}^{5} r2q(t + nT).$$

The frequency offset adjustment is done according to the differential of sumq(t).

$\theta_0$ can be derived based on UW which is detected by correlation. $corr(t)=r(t)*e^{-j\phi_{uw}(t)}=a(t)e^{j(2\pi\Delta ft+\phi_{uw}(t)+\theta_0+\theta_n(t))}*e^{-j\phi(t)}=a(t)e^{j(2\pi\Delta ft+\theta_0+\theta_n(t))}$.

If Δf is small enough to be ignored, then we have, $$E[corr(t)] = \sum_{n=0}^{N} corr(t + nT) = N * a(t)e^{j\theta_0}.$$

A block diagram of the slow tracker module 322 is provided. The input data r(t) is provided to the equalizer module 126 and to a first multiplier 324. The multiplier generates an output r1(t) to a second multiplier 326. The output from the equalizer module 126 is provided as a second input to the second multiplier 326 and the imaginary portion of the result is provided to block 328. The imaginary portion is provided to a smoothing window 330 which sums the results N times (6 for the embodiment disclosed). The output from the smoothing window 330 is differentiated 332 and stored in a register 334. The slow tracking frequency offset is provided to the rotation angle register as θ during the communication phase. The adjustment step is passed to accumulator 336 as feedback into multiplier 324.

In operation, the hardware accelerator module 114 and DSP module 124 employ the functions of the elements of the invention described for three stages of carrier recovery: preamble search stage, BCCH search stage, and communication stage. One special case of the communication stage is a seamless handover mode.

The preamble search stage occurs when the personal station (PS) is powered on for the first time. The RF system continuously receives over-the-air signals and feeds the circuit. Signals (I&Q) at T/3 sampling rate, e.g., 576 kHz from the decimation filter 116 are continuously moved into the burst detector module 130 and also to a delay buffer 134 of size (30+PrSearchLatency)×12×2 to hold the I and Q data. Therefore, in this mode, the carrier recovery module 118 is in working mode while rotator module 120 is idle.

Figure 16:
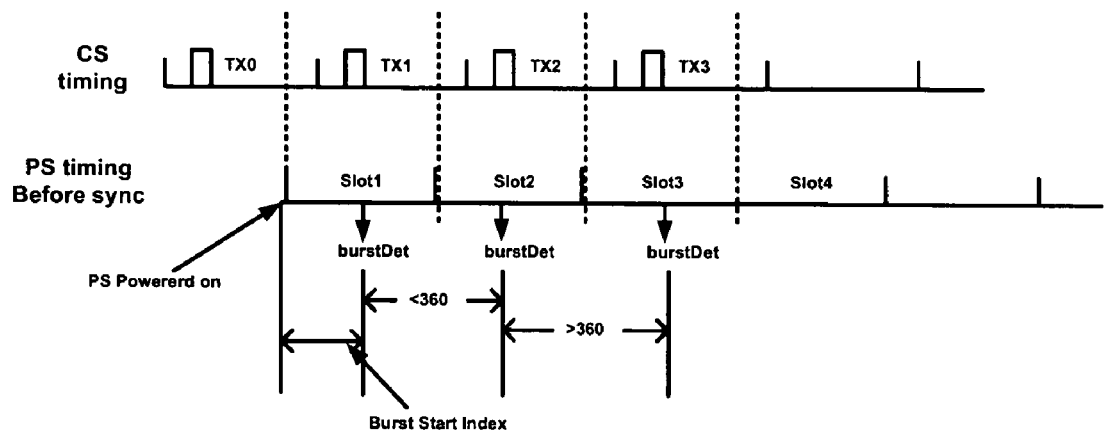
FIG. 16 is a timing diagram of the cell station and personal station timing before synchronization; and, FIG. 17 is a timing diagram of the cell station and personal station timing demonstrating an erroneous burst detection.

After the first preamble is detected, one cell station has possibly been detected. The carrier offset calculator module 132 estimates the rotation angle and writes into the rotation angle register and triggers the rotator module 120 to start operation. Data (the decimated input signal) is moved into the rotator module 120 to perform the carrier offset compensation. The rotated input signal is then held in an A/B buffer 122 (size of 2×736×16 bits), where n is determined by buffer size to hold time stamp, received signal strength indicator (RSSI) values and average amplitude. However, due to the possibility that the identified PR may not correspond to a correct cell station, the carrier recovery module 118 is in working mode to continuously search for the preamble. After one buffer is full or the new burst flag is set, the DSP module 114 is interrupted and the data is moved into the DSP module 114. This case is shown in FIG. 16.

During this mode, carrier recovery module 118 is searching for a cell station and the rotator module 120 is continuously rotating signals from the delay buffer 134. The rotated signals are passed to the A/B buffer 122. However, although normally one burst length is 360 samples, it may be shorter or longer due to different delays from different cell stations and also due to the variations of the burst detected position. Therefore, accommodation of both the possibilities of shorter and longer data is required. If the data length is longer, excess data is discarded since, by design, the end 8 symbols of a burst are guarding symbols. But if the data length is shorter, then a new burst flag needs to be set to start loading the other buffer.

Figure 17:
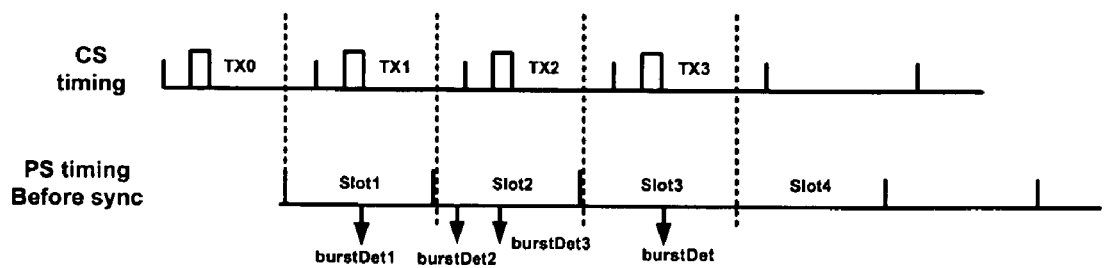

When two consecutive preambles are detected during the preamble searching stage and the time difference between these two preambles detection is less than (0.625−δ) ms, one of the preambles must be false. A mode control bit is dedicated to deal with this special case. FIG. 17 depicts a case when two burst detect flags are set and the time difference between burstDet1 and burstDet2 is less than one burst. Clearly burstDet2 is false.

The status of the mode control bit determines the action taken. When the mode control bit is set, a quality index is checked to determine which preamble is more probable. If the second preamble is more probable, then the rotation angle register is reset after the offset calculator module 132 has derived the new rotation angle. A reset buffer flag is then set to reset A (or B) buffer to override the previous data. On the other hand, if the first preamble is more probable, nothing needs to be done.

When mode control bit is un-set, whenever a preamble detector detects the preamble, the carrier offset calculator module 132 will derive a rotation angle and new burst flag is set. When data is passed to the A/B buffer 122 of FIG. 3, the carrier recovery module is also required to pass the TDMA base counter (21 bits) information representing the time stamp of the burst detection time. This information is necessary for the DSP module 124 to do further processing.

In the standby and communications stage, the timing of the personal station is considered to be in synch with cell station. Only the slow tracker module 322 is tracks the slow variations of the carrier frequency and Doppler shift. Therefore, in this mode, the preamble search stops while the rotator module 120 is in working mode to do the slow tracking. The rotation angle, however, is passed to the DSP module 124 as previously described.

During seamless handover, one of the slots is in communication during which carrier recovery module is working while rotator module 120 is idle, while the other three slots should be in preamble search stage during which the carrier recovery module 118 and rotator module 120 are both working. Therefore, the hardware accelerator module 114 determines the burst edge and switches between these modes.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A communications system comprising:
   a carrier recovery module that determines a carrier frequency offset of an input signal;
   a rotator module that (i) rotates the input signal to minimize the carrier frequency offset and (ii) generates a compensated signal;
   a correlator module that correlates the compensated signal with a unique word to obtain a timing correction; and
   an equalizer module that (i) equalizes the compensated signal based on the timing correction and (ii) generates an equalized signal,
   wherein said carrier recovery module comprises:
      a burst detector module that detects a burst in response to a preamble of the input signal; and
      an average detector to set a gain of a programmable gain amplifier (PGA),
      wherein the average detector
         is (i) disabled during burst search by the burst detector module and (ii) enabled at a beginning of each burst,
         outputs burst data to a digital signal processor when the average detector is enabled, and
         does not output the burst data to the digital signal processor when the average detector is disabled.

2. The communications system of claim 1 further comprising an analog to digital converter that converts an analog input signal to the input signal.

3. The communications system of claim 2 further comprising a decimation filter in communication with the analog to digital converter, wherein the decimation filter provides input data at three times a symbol rate of the input signal.

4. The communications system of claim 1 wherein the carrier recovery module comprises an angle calculator module that detects a time division duplex burst.

5. The communications system of claim 1 wherein the carrier recovery module comprises an angle calculator module that determines an angle of the input signal in response to a coordinated rotation digital computer (CORDIC) module.

6. The communications system of claim 1 wherein the carrier recovery module comprises a carrier offset calculator module that generates a rotation angle.

7. The communications system of claim 6 wherein the rotator module generates the compensated signal based on the rotation angle.

8. The communications system of claim 1 wherein the equalizer module performs feed forward and decision feedback equalization.

9. The communications system of claim 8 wherein the feed forward and decision feedback equalization adjust at least one coefficient based on the timing correction.

10. The communications system of claim 1 further comprising a tracker module that adjusts the equalized signal to compensate for frequency drift.

11. The communication system of claim 1 wherein the communication system employs time division multiple access (TDMA).

12. A personal handy phone system comprising the communications system of claim 11.

13. A communications system comprising:
   an analog front end that converts an analog input signal into a digital data input signal;
   a decimation filter that generates an accelerated input signal at N times a symbol rate of the digital data input signal, wherein N is an integer greater than zero;
   a carrier recovery module that determines a rotation angle for minimizing a carrier frequency offset based on the accelerated input signal;
   a rotator module that rotates the accelerated input signal based on the rotation angle to form a rotated signal; and
   an equalizer module that equalizes the rotated signal,
   wherein said carrier recovery module comprises:
      a burst detector module that detects a time division duplex burst based on a preamble of the digital data input signal; and
      an average detector to set a gain of a programmable gain amplifier (PGA),
      wherein the average detector
         is (i) disabled during burst search by the burst detector module and (ii) enabled at a beginning of each burst,
         outputs burst data to a digital signal processor when the average detector is enabled, and
         does not output the burst data to the digital signal processor when the average detector is disabled.

14. The communications system of claim 13 wherein N is equal to three.

15. The communications system of claim 13 wherein the carrier recovery module comprises a sliding window summing buffer.

16. The communications system of claim 13 wherein the carrier recovery module comprises an angle calculator module including a coordinated rotation digital computer (CORDIC) module.

17. The communications system of claim 16 wherein the angle calculator module performs input scaling for the CORDIC module and output rescaling.

18. The communications system of claim 16 wherein the CORDIC module includes:
an angle accumulator; and
an initializer that initializes the angle accumulator.

19. The communication system of claim 13 wherein the communication system employs time division multiple access (TDMA).

20. A personal handy phone system comprising the communications system of claim 19.

21. A method for operating a communications system comprising:
determining a carrier frequency offset of an input signal;
rotating the input signal to minimize the carrier frequency offset and generating a compensated signal;
correlating the compensated signal with a unique word to obtain a timing correction;
equalizing the compensated signal based on the timing correction and generating an equalized signal;
detecting a burst in response to a preamble of the input signal;
setting a gain of a programmable gain amplifier (PGA) using an average detector that is disabled during burst search and enabled at a beginning of each burst; and
outputting burst data to a digital signal processor when the average detector is enabled, and not outputting the burst data to the digital signal processor when the average detector is disabled.

22. The method of claim 21 further comprising converting an analog input signal to the input signal.

23. The method of claim 22 further comprising sampling the input signal at three times a symbol rate of the input signal.

24. The method of claim 21 further comprising detecting a time division duplex burst.

25. The method of claim 21 further comprising determining an angle of the input signal in response to a coordinated rotation digital computer (CORDIC) module.

26. The method of claim 21 further comprising generating a rotation angle.

27. The method of claim 26 further comprising generating the compensated signal based on the rotation angle.

28. The method of claim 21 further comprising using feed forward and decision feedback equalization to adjust at least one coefficient based on the timing correction.

29. The method of claim 21 further comprising adjusting the equalized signal to compensate for frequency drift.

30. A method for operating a communications system comprising:
converting an analog input signal into a digital data input signal;
generating an accelerated input signal at N times a symbol rate of the digital data input signal, wherein N is an integer greater than zero;
determining a rotation angle for minimizing a carrier frequency offset based on the accelerated input signal;
rotating the accelerated input signal based on the rotation angle to form a rotated signal,
equalizing the rotated signal;
detecting a time division duplex burst in response to a preamble of the digital data input signal;
setting a gain of a programmable gain amplifier (PGA) using an average detector that is disabled during burst search and enabled at a beginning of each burst; and
outputting burst data to a digital signal processor when the average detector is enabled, and not outputting the burst data to the digital signal processor when the average detector is disabled.

31. The method of claim 30 wherein N is equal to three.

32. The method of claim 30 wherein the determining comprises using sliding window summing.

33. The method of claim 30 wherein the determining comprises calculating the rotation angle using a coordinated rotation digital computer (CORDIC) module.

34. The method of claim 33 further comprising performing input scaling for the CORDIC module and output rescaling.

35. The communications system of claim 1 wherein the equalizer module comprises:
a feed forward equalizer (FFE) convolution filter that receives the compensated signal and the timing correction and that generates a first output;
a slicer module that generates a feedback signal based on the first output; and
a decision feedback equalization (DFE) convolution filter that generates a second output based on the feedback signal,
wherein the slicer module receives the second output, and wherein the equalizer module generates an error signal based on the first and second outputs and the feedback signal.

36. The communications system of claim 35 further comprising an update module that updates coefficients of the FFE and DFE convolution filters based on the error signal.

37. The communications system of claim 35 wherein:
the FFE convolution filter includes 2N taps and operates at N times a symbol rate of the input signal, where N is an integer greater than zero; and
the DFE convolution filter includes one tap and operates at the symbol rate.

38. A communications system comprising:
a carrier recovery module that determines a carrier frequency offset of an input signal;
a rotator module that (i) rotates the input signal to minimize the carrier frequency offset and (ii) generates a compensated signal;
a correlator module that correlates the compensated signal with a unique word to obtain a timing correction;
an equalizer module that (i) equalizes the compensated signal based on the timing correction and (ii) generates an equalized signal; and
a tracker module that includes:
a first multiplier that receives the input signal and a feedback signal and that generates a first output;
a second multiplier that (i) receives the first output and the equalized signal and (ii) generates a second output;
a sliding window summing buffer that (i) sums an imaginary portion of the second output N times and (ii) generates a third output, where N is an integer greater than zero;
a differentiator that (i) differentiates the third output and (ii) generates a tracking frequency offset; and
an accumulator that generates the feedback signal based on the tracking frequency offset, wherein the tracker module adjusts the equalized signal based on the tracking frequency offset, and wherein the rotator module rotates the input signal based on the tracking frequency offset.

* * * * *